(12) United States Patent
Huang et al.

(10) Patent No.: US 12,739,753 B2
(45) Date of Patent: Sep. 15, 2026

(54) POWER CONTROL TECHNIQUES FOR UPLINK CONTROL CHANNELS ON MULTIPLE COMPONENT CARRIERS

(71) Applicant: QUALCOMM Incorporated, San Diego, CA (US)

(72) Inventors: Yi Huang, San Diego, CA (US); Peter Gaal, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 17/559,846

(22) Filed: Dec. 22, 2021

(65) Prior Publication Data

US 2022/0312335 A1 Sep. 29, 2022

Related U.S. Application Data

(60) Provisional application No. 63/167,579, filed on Mar. 29, 2021.

(51) Int. Cl.
*H04W 52/14* (2009.01)
*H04W 52/24* (2009.01)
(Continued)

(52) U.S. Cl.
CPC ....... *H04W 52/146* (2013.01); *H04W 52/242* (2013.01); *H04W 52/36* (2013.01); *H04W 52/42* (2013.01)

(58) Field of Classification Search
CPC . H04W 52/146; H04W 52/242; H04W 52/36; H04W 52/42
See application file for complete search history.

(56) References Cited

U.S. PATENT DOCUMENTS 9,084,209 B2 7/2015 Gaal et al.
9,844,007 B2 * 12/2017 Harada ................. H04W 52/44
(Continued)

FOREIGN PATENT DOCUMENTS

CN 1957542 A * 5/2007 .......... H04W 52/327
EP 2945437 A1 11/2015
(Continued)

OTHER PUBLICATIONS

International Search Report and Written Opinion—PCT/US2022/020347—ISA/EPO—Jun. 24, 2022.

*Primary Examiner* — Charles N Appiah
*Assistant Examiner* — Nicole M Louis-Fils
(74) *Attorney, Agent, or Firm* — Holland & Hart LLP

(57) ABSTRACT

Methods, systems, and devices for wireless communications are described for uplink carrier aggregation in which uplink control channel communications may be transmitted on a primary component carrier (CC) and one or more secondary CCs. Uplink transmission power control for the control channel communications may be determined based on a power control configuration provided by a base station. The primary CC and secondary CC(s) may use a same set of power control parameters based on being within a same frequency band, and may use different power control parameters when one or more of the CCs are in a different frequency bands. Power control commands to increase or decrease transmit power may be accumulated on a per-CC basis, or across multiple CCs, based at least in part on the power control configuration.

27 Claims, 20 Drawing Sheets

(51) Int. Cl.
*H04W 52/36* (2009.01)
*H04W 52/42* (2009.01)

(56) References Cited

U.S. PATENT DOCUMENTS

| | | | | |
|---|---|---|---|---|
| 10,873,958 | B1 * | 12/2020 | Mansour | H04W 72/1268 |
| 2014/0226551 | A1 * | 8/2014 | Ouchi | H04W 52/244<br>370/311 |
| 2016/0112966 | A1 * | 4/2016 | Jung | H04W 52/34<br>370/311 |
| 2016/0227486 | A1 * | 8/2016 | Park | H04W 72/21 |
| 2017/0013563 | A1 * | 1/2017 | Yang | H04W 52/146 |
| 2018/0234925 | A1 * | 8/2018 | Suzuki | H04W 52/221 |
| 2019/0191328 | A1 * | 6/2019 | Dinan | H04W 52/42 |
| 2020/0267663 | A1 * | 8/2020 | Xu | H04W 52/242 |
| 2022/0217654 | A1 * | 7/2022 | Kang | H04W 52/14 |
| 2024/0080774 | A1 * | 3/2024 | Wang | H04L 1/1854 |

FOREIGN PATENT DOCUMENTS

| | | | | |
|---|---|---|---|---|
| JP | 2016508342 A | | 3/2016 | |
| WO | WO-2012064872 A1 | | 5/2012 | |
| WO | WO-2018231755 A1 | * | 12/2018 | H04W 52/146 |
| WO | WO-2020008647 A1 | | 1/2020 | |

* cited by examiner

PUCCH 210

PDCCH 215

200

800

900

1100

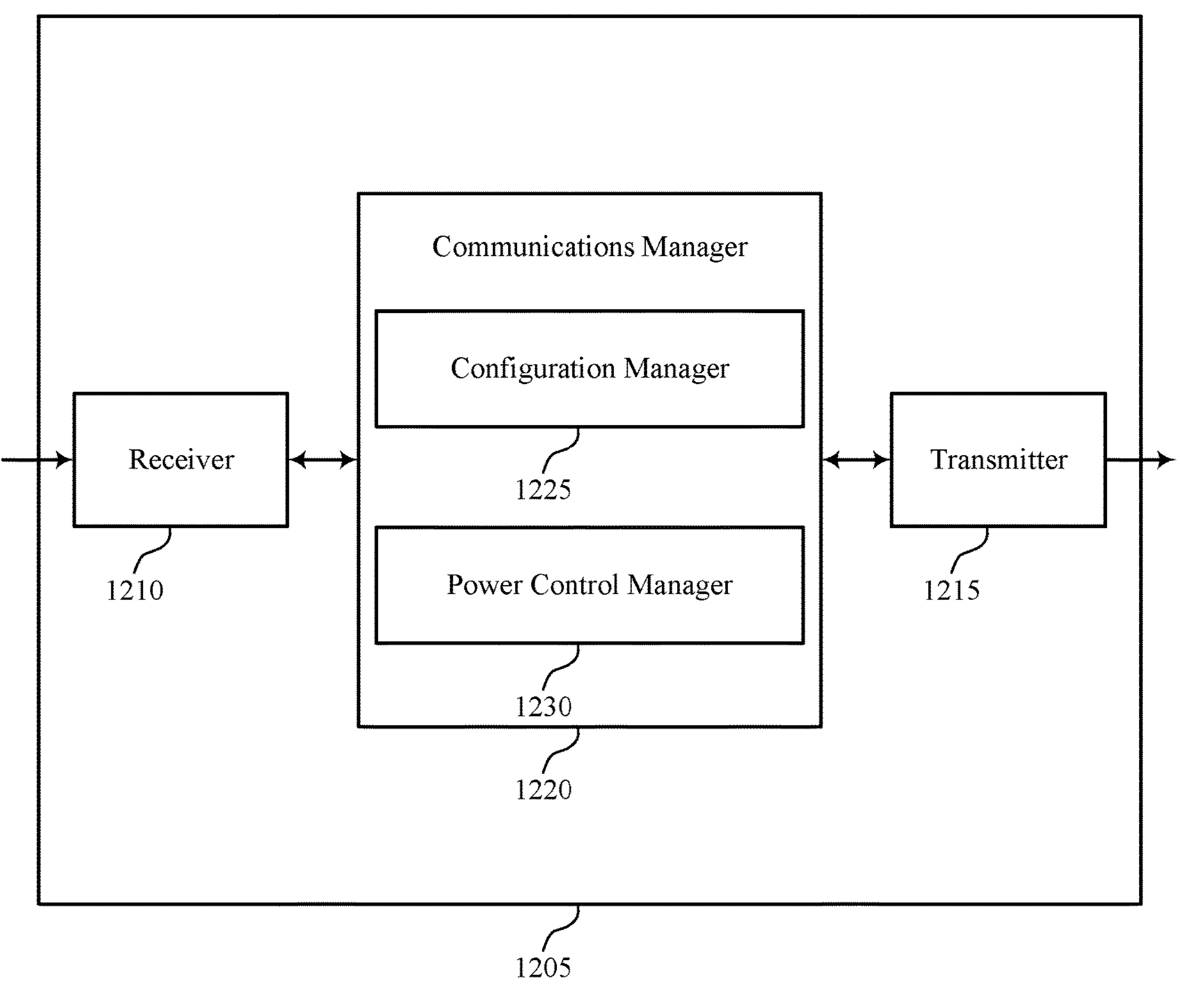
FIG. 12

1300

Figure 18:
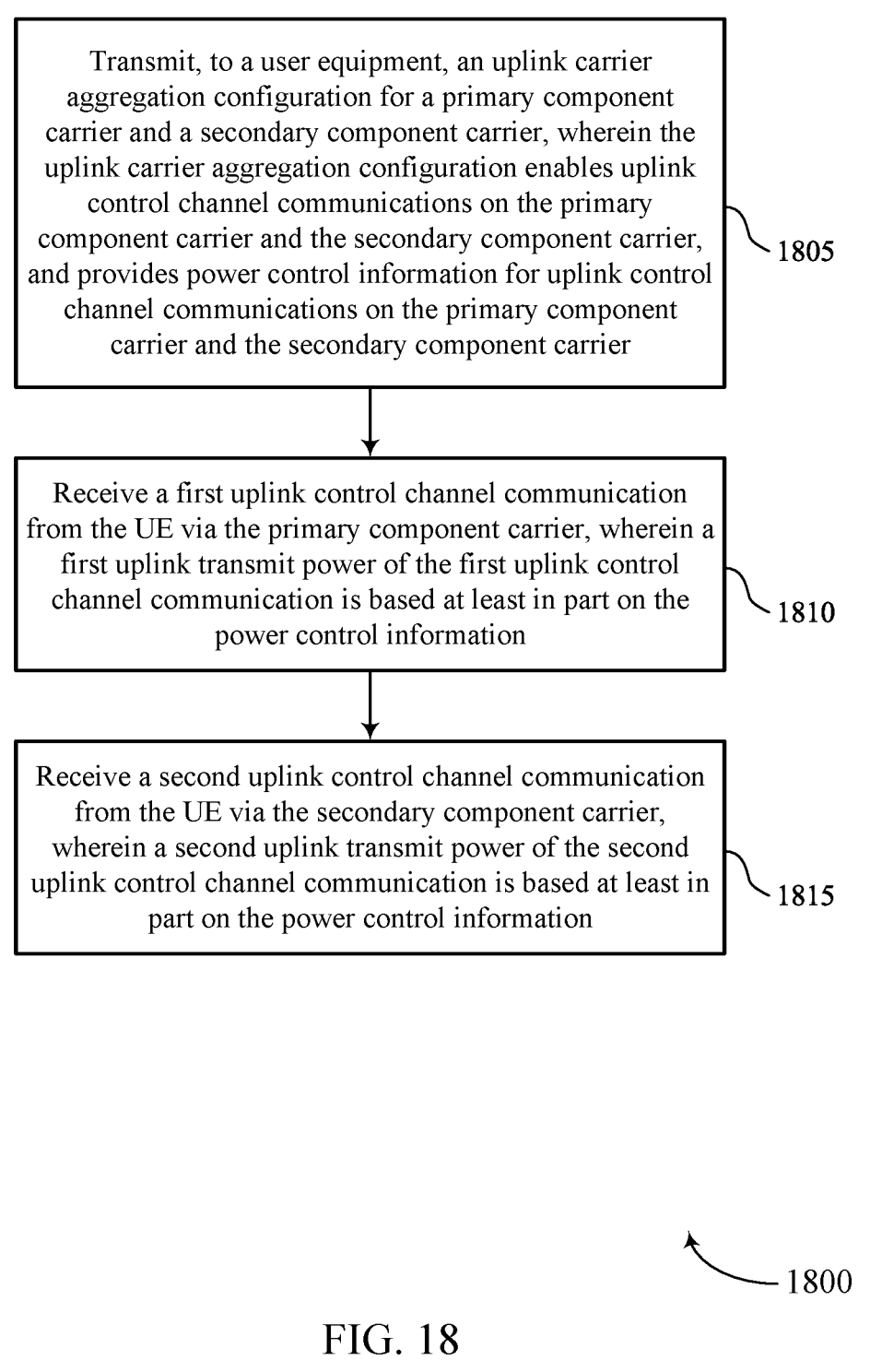

Transmit, to a user equipment, an uplink carrier aggregation configuration for a primary component carrier and a secondary component carrier, wherein the uplink carrier aggregation configuration enables uplink control channel communications on the primary component carrier and the secondary component carrier, and provides power control information for uplink control channel communications on the primary component carrier and the secondary component carrier

1805

Receive a first uplink control channel communication from the UE via the primary component carrier, wherein a first uplink transmit power of the first uplink control channel communication is based at least in part on the power control information

1810

Receive a second uplink control channel communication from the UE via the secondary component carrier, wherein a second uplink transmit power of the second uplink control channel communication is based at least in part on the power control information

Figure 19:
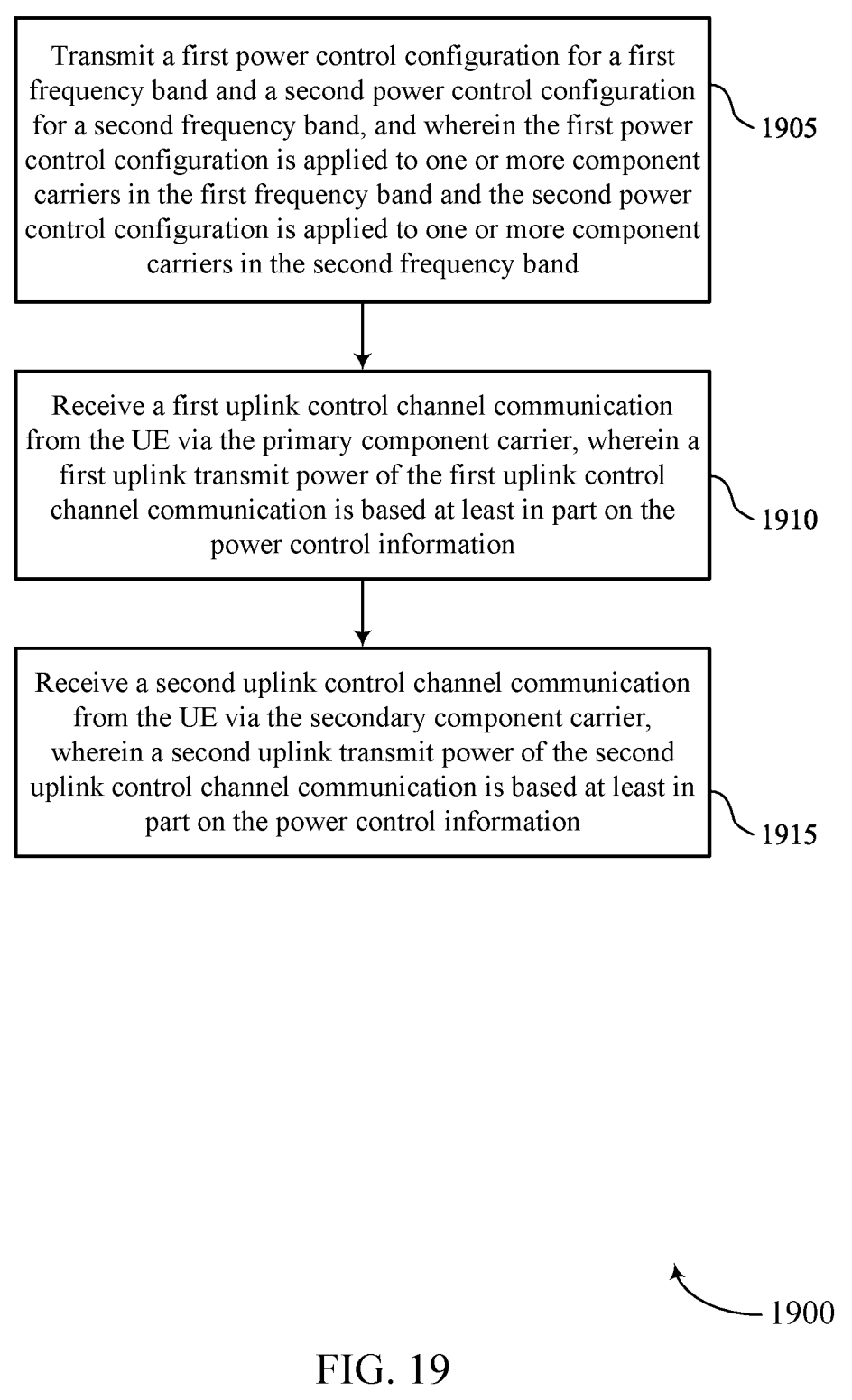

Transmit a first power control configuration for a first frequency band and a second power control configuration for a second frequency band, and wherein the first power control configuration is applied to one or more component carriers in the first frequency band and the second power control configuration is applied to one or more component carriers in the second frequency band

1905

Receive a first uplink control channel communication from the UE via the primary component carrier, wherein a first uplink transmit power of the first uplink control channel communication is based at least in part on the power control information

1910

Receive a second uplink control channel communication from the UE via the secondary component carrier, wherein a second uplink transmit power of the second uplink control channel communication is based at least in part on the power control information

POWER CONTROL TECHNIQUES FOR UPLINK CONTROL CHANNELS ON MULTIPLE COMPONENT CARRIERS

CROSS REFERENCE

The present Application for Patent claims the benefit of U.S. Provisional Patent Application No. 63/167,579 by HUANG et al., entitled "POWER CONTROL TECHNIQUES FOR UPLINK CONTROL CHANNELS ON MULTIPLE COMPONENT CARRIERS," filed Mar. 29, 2021, assigned to the assignee hereof, and expressly incorporated by reference herein.

FIELD OF TECHNOLOGY

The following relates to wireless communications, including power control techniques for uplink control channels on multiple component carriers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, UEs and base stations may use multiple component carriers for communications, in which each component carrier may carry uplink communications from a UE to a base station, downlink communications from a base station to a UE, or combinations thereof. Such techniques may enhance an amount of data that may be transferred between the UE and base station and reduce latency for communications. Techniques for further enhancement of communications using multiple component carriers may help to further increase data rates and reduce latency for communications.

SUMMARY

The described techniques relate to improved methods, systems, devices, and apparatuses that support power control techniques for uplink control channels on multiple component carriers. In various aspects, described techniques provide for uplink power control for uplink control channel transmissions on multiple configured uplink component carriers (CCs). In some cases, uplink control channel communications (e.g. physical uplink control channel (PUCCH) communications) may be transmitted on a primary component carrier (PCC) or a secondary component carrier (SCC), and uplink power control for the control channel communications may be determined based on a power control configuration provided by a base station. In some cases, the PCC and SCC may use a same set of power control parameters based on the PCC and the SCC being within a same frequency band. In other cases, the PCC and SCC may use different power control parameters based on the PCC and SCC being in different frequency bands. Additionally or alternatively, power control commands to increase or decrease transmit power may be accumulated on a per-CC basis, or across multiple CCs, based at least in part on the power control configuration.

A method for wireless communication at a user equipment (UE) is described. The method may include receiving an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier, transmitting a first uplink control channel communication to a base station via the primary component carrier using a first uplink transmit power that is based on the power control information, and transmitting a second uplink control channel communication to the base station via the secondary component carrier using a second uplink transmit power that is based on the power control information.

An apparatus for wireless communication at a UE is described. The apparatus may include a processor, and memory coupled with the processor. The processor and memory may be configured to receive an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier, transmit a first uplink control channel communication to a base station via the primary component carrier using a first uplink transmit power that is based on the power control information, and transmit a second uplink control channel communication to the base station via the secondary component carrier using a second uplink transmit power that is based on the power control information.

Another apparatus for wireless communication at a UE is described. The apparatus may include means for receiving an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier, means for transmitting a first uplink control channel communication to a base station via the primary component carrier using a first uplink transmit power that is based on the power control information, and means for transmitting a second uplink control channel communication to the base station via the secondary component carrier using a second uplink transmit power that is based on the power control information.

A non-transitory computer-readable medium storing code for wireless communication at a UE is described. The code may include instructions executable by a processor to receive an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier, transmit a first uplink control channel communication to a base station via the primary component carrier using a first uplink transmit power that is based on the power control information, and transmit a second uplink control channel communication to the base station via the secondary component carrier using a second uplink transmit power that is based on the power control information.

In some examples of the method, apparatuses, and non-transitory computer-readable medium described herein, the receiving the uplink carrier aggregation configuration may include operations, features, means, or instructions for receiving a first power control configuration for the primary component carrier and a second power control configuration for the secondary component carrier. In some examples of the method, apparatuses, and non-transitory computer-readable medium described herein, the first power control configuration and the second power control configuration include parameters for p0-nominal, p0-Set, pathlossReferenceRSs, and physical uplink control channel (PUCCH)-SpatialRelationInfo.

In some examples of the method, apparatuses, and non-transitory computer-readable medium described herein, the first power control configuration may be received for each component carrier in a first group of component carriers (e.g., component carriers in a first frequency band), and the second power control configuration may be received for each component carrier in a second group of component carriers (e.g., component carriers in a second frequency band). In some examples of the method, apparatuses, and non-transitory computer-readable medium described herein, the first power control configuration and the second power control configuration are received in radio resource control (RRC) signaling that provides uplink control channel power configuration parameters for configured component carriers. In some examples of the method, apparatuses, and non-transitory computer-readable medium described herein, the first power control configuration includes a first indication of one or more component carriers in the first frequency band that are to use the first power control configuration, and the second power control configuration includes a second indication of one or more component carriers in the second frequency band that are to use the second power control configuration. In some examples of the method, apparatuses, and non-transitory computer-readable medium described herein, the first power control configuration and the second power control configuration may be received in RRC signaling that provides uplink control channel power configuration parameters and a listing of corresponding component carriers for each power control configuration. In some examples of the method, apparatuses, and non-transitory computer-readable medium described herein, the primary component carrier corresponds to a primary cell (PCell) and the secondary component carrier corresponds to a secondary cell (SCell) in the uplink carrier aggregation configuration.

Some examples of the method, apparatuses, and non-transitory computer-readable medium described herein may further include operations, features, means, or instructions for receiving, from the base station, a first power control command that indicates an incremental increase or decrease in transmit power for the primary component carrier, receiving, from the base station, a second power control command that indicates an incremental increase or decrease in transmit power for the secondary component carrier, and applying one or more of the first power control command or the second power control command to one or more of the primary component carrier or the secondary component carrier. In some examples of the method, apparatuses, and non-transitory computer-readable medium described herein, the applying may include operations, features, means, or instructions for applying both the first power control command and the second power control command to each of the primary component carrier and the secondary component carrier (e.g., based on both of the primary component carrier and the secondary component carrier being in a same frequency band). In some examples of the method, apparatuses, and non-transitory computer-readable medium described herein, the applying may include operations, features, means, or instructions for applying the first power control command to the primary component carrier and the second power control command to the secondary component carrier (e.g., based on the primary component carrier and the secondary component carrier being in different frequency bands). Some examples of the method, apparatuses, and non-transitory computer-readable medium described herein may further include operations, features, means, or instructions for receiving an indication from the base station that indicates whether to apply power control commands on a per component carrier basis or across multiple component carriers, and where one or more of the first power control command or the second power control command are applied to each component carrier based on the indication.

A method for wireless communication at a base station is described. The method may include transmitting, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier, receiving a first uplink control channel communication from the UE via the primary component carrier, where a first uplink transmit power of the first uplink control channel communication is based on the power control information, and receiving a second uplink control channel communication from the UE via the secondary component carrier, where a second uplink transmit power of the second uplink control channel communication is based on the power control information.

An apparatus for wireless communication at a base station is described. The apparatus may include a processor, and memory coupled with the processor. The processor and memory may be configured to transmit, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier, receive a first uplink control channel communication from the UE via the primary component carrier, where a first uplink transmit power of the first uplink control channel communication is based on the power control information, and receive a second uplink control channel communication from the UE via the secondary component carrier, where a second uplink transmit power of the second uplink control channel communication is based on the power control information.

Another apparatus for wireless communication at a base station is described. The apparatus may include means for transmitting, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier, means for receiving a first uplink control channel communication from the UE via the primary component carrier, where a first uplink transmit power of the first uplink control channel communication is based on the power control information, and means for receiving a second uplink control channel communication from the UE via the secondary component carrier, where a second uplink transmit power of the second uplink control channel communication is based on the power control information.

A non-transitory computer-readable medium storing code for wireless communication at a base station is described. The code may include instructions executable by a processor to transmit, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier, receive a first uplink control channel communication from the UE via the primary component carrier, where a first uplink transmit power of the first uplink control channel communication is based on the power control information, and receive a second uplink control channel communication from the UE via the secondary component carrier, where a second uplink transmit power of the second uplink control channel communication is based on the power control information.

In some examples of the method, apparatuses, and non-transitory computer-readable medium described herein, the transmitting the uplink carrier aggregation configuration may include operations, features, means, or instructions for transmitting a first power control configuration for the primary component carrier and a second power control configuration for the secondary component carrier. In some examples of the method, apparatuses, and non-transitory computer-readable medium described herein, the first power control configuration is provided for each component carrier in a first frequency band, and the second power control configuration is provided for each component carrier in a second frequency band. In some examples of the method, apparatuses, and non-transitory computer-readable medium described herein, the first power control configuration and the second power control configuration may be provided in RRC signaling that provides uplink control channel power configuration parameters for configured component carriers.

In some examples of the method, apparatuses, and non-transitory computer-readable medium described herein, the first power control configuration includes a first indication of a first group of component carriers that are to use the first power control configuration, and the second power control configuration includes a second indication of a second group of component carriers that are to use the second power control configuration. In some examples of the method, apparatuses, and non-transitory computer-readable medium described herein, the first power control configuration and the second power control configuration may be provided in RRC signaling that provides uplink control channel power configuration parameters and a listing of corresponding component carriers for each power control configuration. In some examples of the method, apparatuses, and non-transitory computer-readable medium described herein, the primary component carrier corresponds to a primary cell (PCell) and the secondary component carrier corresponds to a secondary cell (SCell) in the uplink carrier aggregation configuration.

Some examples of the method, apparatuses, and non-transitory computer-readable medium described herein may further include operations, features, means, or instructions for transmitting, to the UE, a first power control command that indicates an incremental increase or decrease in transmit power for the primary component carrier, transmitting, to the UE, a second power control command that indicates an incremental increase or decrease in transmit power for the secondary component carrier, and where the UE is configured to apply one or more of the first power control command or the second power control command to one or more of the primary component carrier or the secondary component carrier. Some examples of the method, apparatuses, and non-transitory computer-readable medium described herein may further include operations, features, means, or instructions for configuring the UE to apply both the first power control command and the second power control command to each of the primary component carrier and the secondary component carrier. Some examples of the method, apparatuses, and non-transitory computer-readable medium described herein may further include operations, features, means, or instructions for configuring the UE to apply the first power control command to the primary component carrier and the second power control command to the secondary component carrier. Some examples of the method, apparatuses, and non-transitory computer-readable medium described herein may further include operations, features, means, or instructions for transmitting an indication to the UE that indicates whether to apply power control commands on a per component carrier basis or across multiple component carriers.

BRIEF DESCRIPTION OF THE DRAWINGS

FIGS. 11 and 12 show block diagrams of devices that support power control techniques for uplink control channels on multiple component carriers in accordance with aspects of the present disclosure.

FIGS. 15 through 20 show flowcharts illustrating methods that support power control techniques for uplink control channels on multiple component carriers in accordance with aspects of the present disclosure.

DETAILED DESCRIPTION

Figure 1:
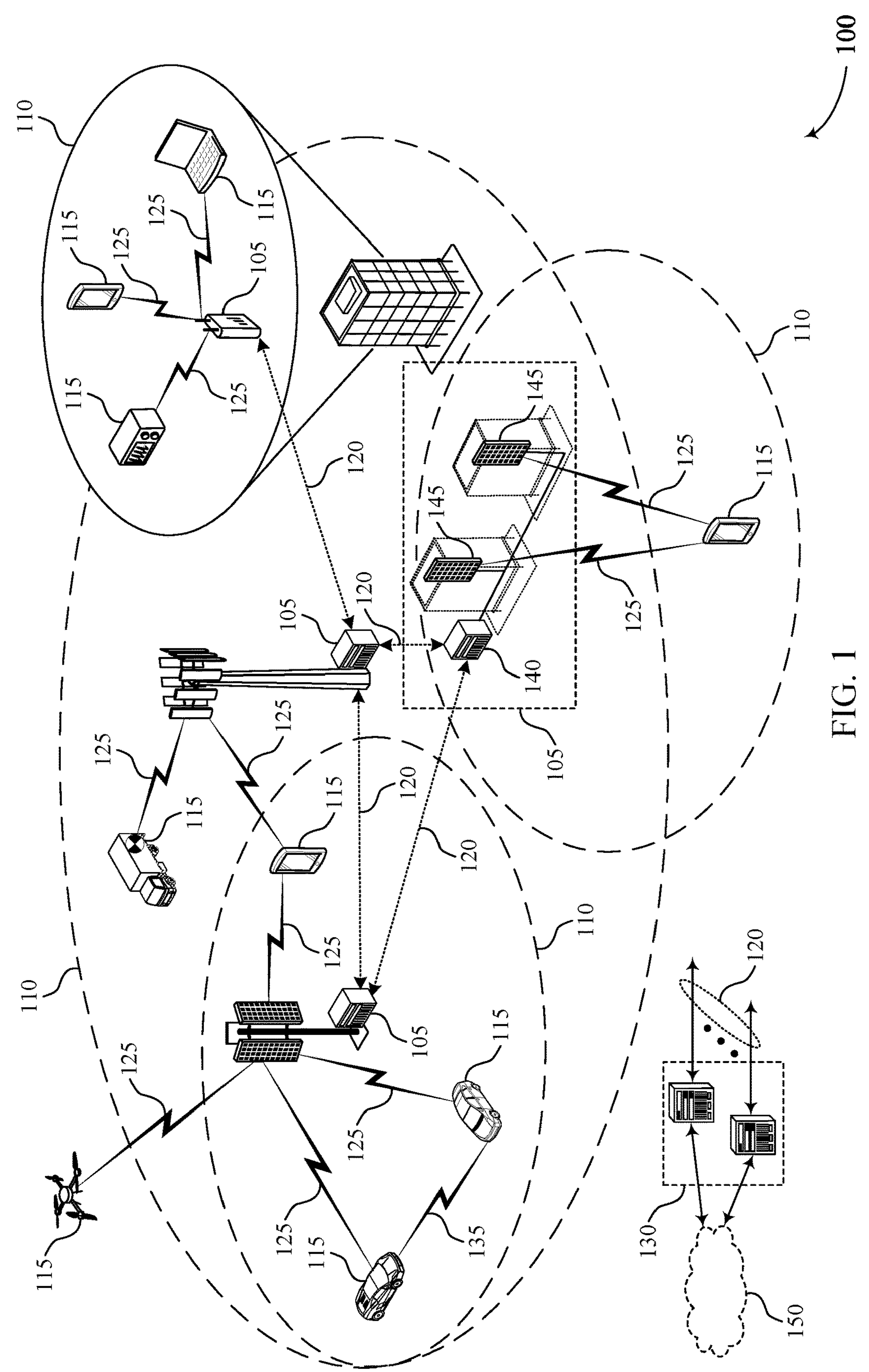
FIG. 1 illustrates an example of a wireless communications system that supports power control techniques for uplink control channels on multiple component carriers in accordance with aspects of the present disclosure.

Some wireless communication systems may include communication devices, such as user equipment and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may, in some examples, support one or more of the above example radio access technologies. A user equipment (UE) may communicate with a base station in a wireless communications system. The base station may transmit downlink communications to the UE, and the UE may transmit uplink communications to the base station. The downlink and uplink transmissions may include data and control transmissions. For example, the UE may transmit uplink control transmissions in a physical uplink control channel (PUCCH) transmission. The UE may transmit a PUCCH transmission, such as uplink control information (UCI) on a PUCCH, to a base station using a configured PUCCH scheme (e.g., according to a PUCCH type or format). Further, in some cases, communications between the base station and UE may use carrier aggregation (CA) techniques, in which multiple component carriers (CCs) may be configured to carry downlink communications, uplink communications, or both.

For PUCCH transmissions, the UE may determine a power level of a PUCCH transmission based on an uplink power control configuration. In some deployments, PUCCH transmissions may be provided only on a primary component carrier (PCC), which in some cases may be referred to as a primary cell (PCell). In such cases, the uplink power control configuration for PUCCH transmissions is provided for the PCC. However, in some cases it may be beneficial to transmit PUCCH on one or more secondary component carriers (SCCs or SCells), which may allow a PUCCH to be transmitted with lower latency due to earlier available resources for PUCCH on an SCC relative to the PCC. Further, uplink control channel transmissions may use a different transmit power than used for uplink shared channel communications (e.g., physical uplink shared channel (PUSCH) transmissions). In various aspects as discussed herein, power control techniques for uplink control channel transmissions on a PCC and one or more SCCs are provided, and a UE may use such techniques to determine uplink transmit power for uplink control channel transmissions on a PCC, one or more SCCs, or combinations thereof. p In some cases, open loop power control may be used, and separate power control configurations may be provided for each CC that may indicate separate initial powers (Po) and reference signal IDs for each CC. In some cases, for intra-band CA a common power control configuration may be provided for multiple intra-band CCs. In some cases, the power control configuration may be provided separately for each CC, by duplicating a power control configuration that is provided for the PCC across each intra-band SCC. In other cases, a power control configuration may be provided that indicates the CCs to which it applies, such as by an information field added to the configuration information that lists CCs. For inter-band CA, different power control configurations may be provided for CCs that are in different bands. In some cases, for closed-loop power control, power control commands may be provided as absolute power control for each CC. In some cases, for absolute power control, the power control command only applies to the CC where the PUCCH is determined to be transmitted. In other cases, closed-loop power control may be provided as an accumulative adjustment to a transmit power. In cases where accumulative adjustments are used for power control, a UE may accumulate power control commands separately for each CC, or across CCs. In some cases, power control commands may be accumulated separately for CCs that are in different bands, and power control commands may be accumulated across CCs for intra-band CCs. In some cases, a base station may configure a UE to perform accumulation of power control commands per-CC or across CCs.

Aspects of the disclosure are initially described in the context of wireless communications systems. Aspects of the disclosure are further illustrated by and described with reference to CC groups and resources, process flows, apparatus diagrams, system diagrams, and flowcharts that relate to power control techniques for uplink control channels on multiple component carriers.

FIG. 1 illustrates an example of a wireless communications system 100 that supports power control techniques for uplink control channels on multiple component carriers in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, uplink carrier aggregation may be used for communications between one or more UEs 115 and associated serving base stations 105. Further, in some cases, uplink control channel communications may be transmitted on a PCC and one or more SCCs, and uplink power control for the control channel communications may be determined at a UE 115 based on a power control configuration provided by a base station 105. In some cases, the PCC and SCC may use a same set of power control parameters based on the PCC and the SCC being within a same frequency band. In other cases, the PCC and SCC may use different power control parameters based on the PCC and SCC being in different frequency bands. Additionally or alternatively, power control commands to increase or decrease transmit power may be accumulated on a per-CC basis, or across multiple CCs, based at least in part on the power control configuration.

Figure 2:
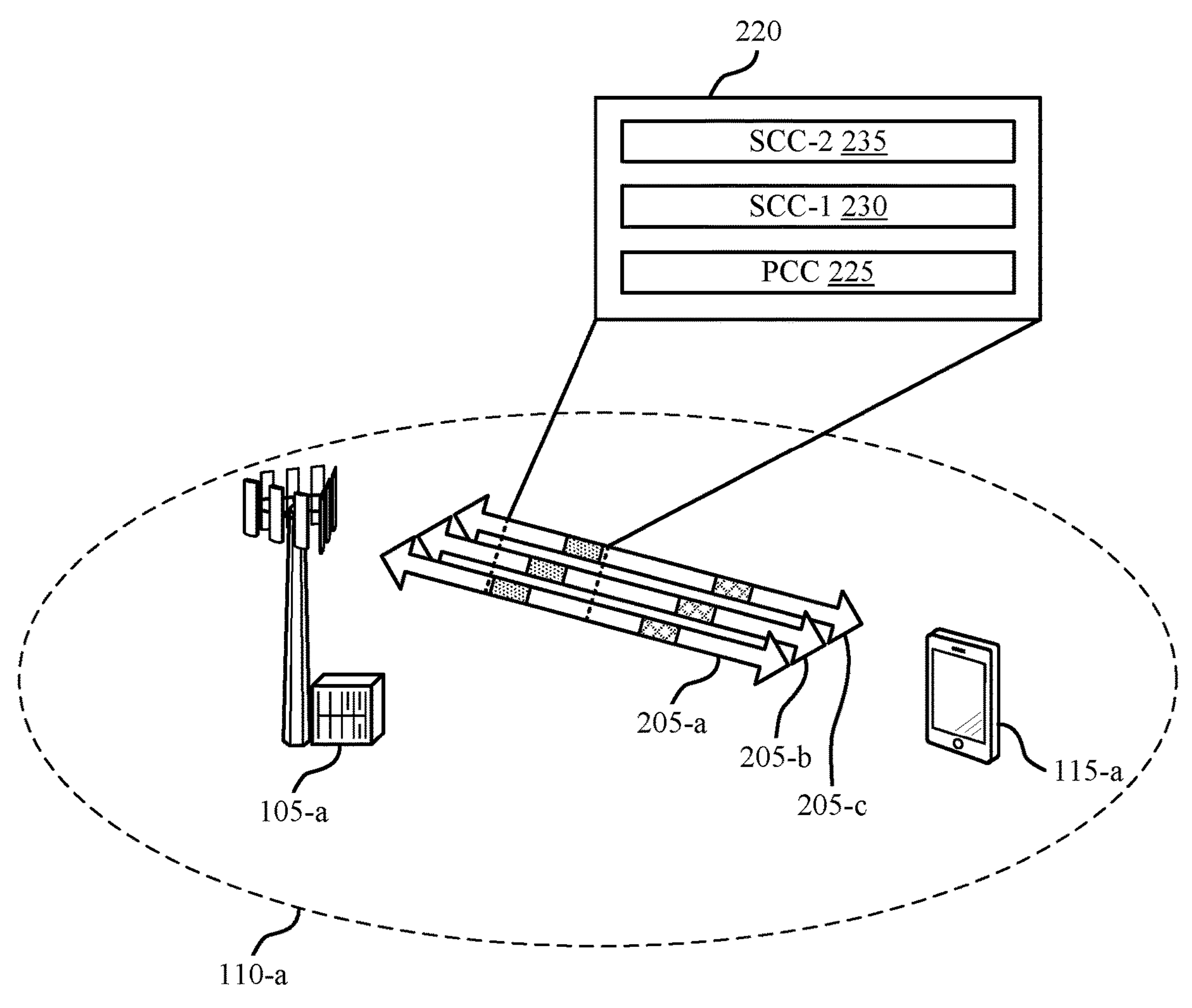
FIG. 2 illustrates an example of a portion of a wireless communications system that supports power control techniques for uplink control channels on multiple component carriers in accordance with aspects of the present disclosure.

FIG. 2 illustrates an example of a wireless communications system 200 that supports power control techniques for uplink control channels on multiple component carriers in accordance with aspects of the present disclosure. In some examples, the wireless communications system 200 may implement aspects of wireless communications system 100. UE 115-*a* may be an example of a UE 115 as described with respect to FIG. 1, and base station 105-*a* may be an example of a base station 105 as described with respect to FIG. 1. The base station 105-*a* may serve one or more UEs 115, including UE 115-*a,* within coverage area 110-*a*. The base station 105-*a* and UE 115-*a* in this example may exchange uplink and downlink communications using multiple CCs 205, including a first CC 205-*a,* a second CC 205-*b,* and a third CC 205-*c*.

In some cases, UE 115-*a* may be configured with a PUCCH group 220 that includes a PCC 225, a first SCC 230, or a second SCC 235. In various existing systems, PUCCH 210 may be transmitted only on PCC 225, but in order to provide additional opportunities for UCI transmissions, in some cases, a PUCCH 210 carrier switch may provide that one or more of first SCC 230 of second SCC 235 may be used to transmit PUCCH 210. In some cases, power control may be configured for PUCCH 210 transmissions in accordance with various techniques as discussed herein. In some cases, the power control configuration may be provided to the UE 115-*a* in PDCCH 215. In some cases, power control configuration may be provided in radio resource control (RRC) signaling, in one or more MAC control elements (CEs), in downlink control information (DCI), or any combinations thereof. Such techniques may provide for reduced latency in transmission of HARQ acknowledgment feedback for one or more downlink transmissions, for example, which may enhance efficiency of wireless communications.

Figure 3:
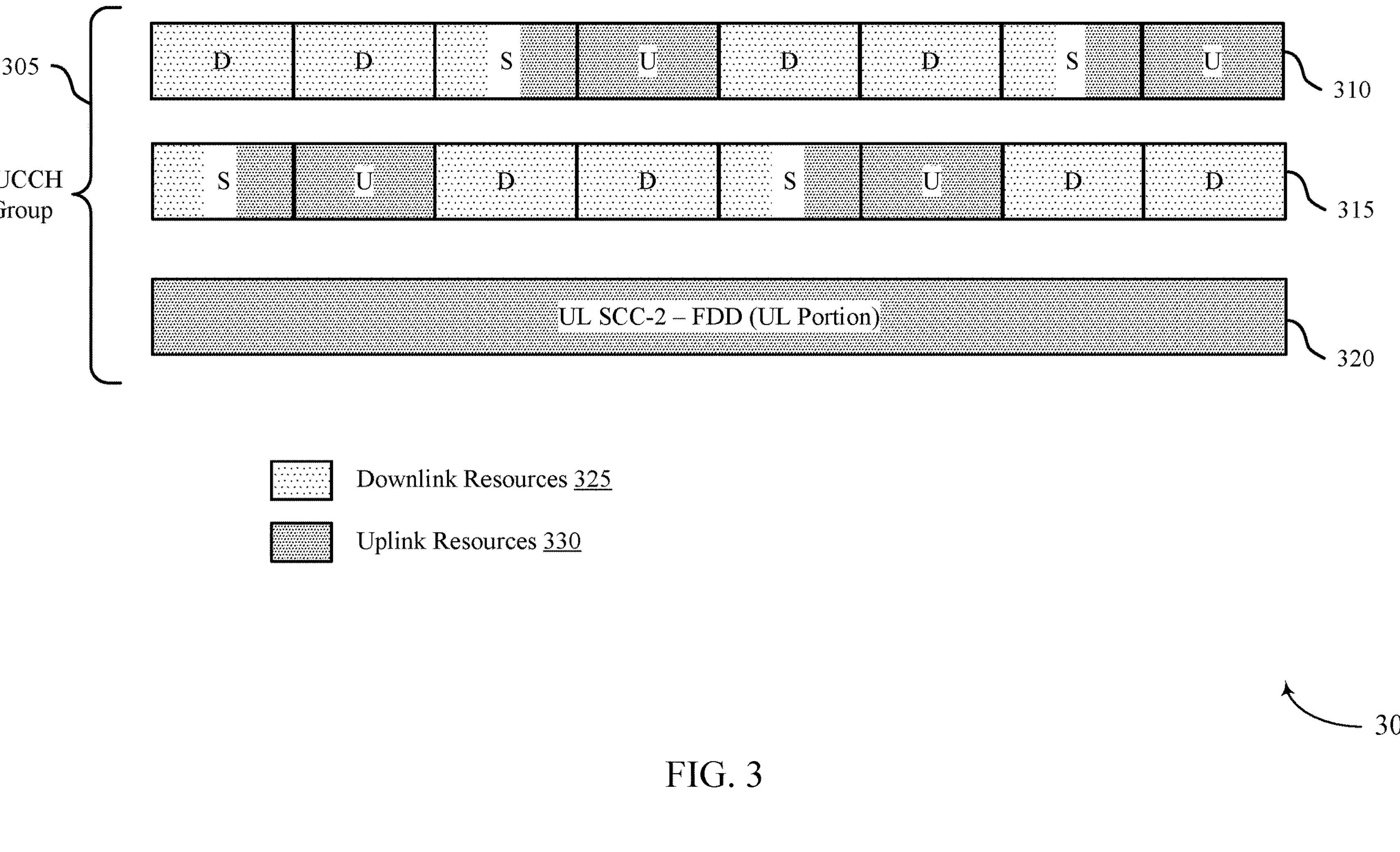
FIG. 3 illustrates an example of component carrier resources that support power control techniques for uplink control channels on multiple component carriers in accordance with aspects of the present disclosure.

FIG. 3 illustrates an example of component carrier resources 300 that support power control techniques for uplink control channels on multiple component carriers in accordance with aspects of the present disclosure. In some examples, component carrier resources 300 may implement aspects of wireless communications system 100 or 200. In this example, a base station (e.g., a base station 105 of FIG. 1 or 2) may configure multiple CCs at a UE (e.g., a UE 115 of FIG. 1 or 2), which may include a configuration of a PUCCH group 305.

As illustrated in FIG. 3, the PUCCH group 305 may include a PCC 310, a first SCC 315, and a second SCC 320. In this example, the PCC 310 may include downlink slots (D) for downlink communications to the UE, uplink slots (U) for uplink communications to a base station, and special slots (S), which include both some downlink and uplink resources and a transmission gap that may be used at the UE to tune RF components from a downlink to an uplink configuration. In the example of FIG. 3, downlink resources 325 and uplink resources 330 are illustrated for the CCs. In this example, a slot configuration may be DDSUDDSU, for the PCC 310 and first SCC 315, with a two-slot offset between the PCC 310 and the first SCC 315. Further, the second SCC 320 may be a frequency division duplexing (FDD) carrier, with just the uplink portion illustrated in FIG. 3. Such a PUCCH group 305 may allow for UCI to be transmitted using the PCC 310, or one or more of the first SCC 315 or second SCC 320. By providing the ability to transmit UCI on the first SCC 315 or second SCC 320, latency for certain types of communications may be reduced. For example, if the UE has HARQ feedback to be transmitted to the base station, additional uplink resources may be provided relative to cases where UCI may be transmitted using only PCC 310, which may reduce latency associated with HARQ feedback. Reduced HARQ feedback latency may provide that any retransmissions may be initiated more quickly, which may help provide higher throughput and reliability. Further, reduced HARQ feedback latency may release HARQ process IDs for subsequent transmissions more quickly which may allow additional transmissions to be initiated and also help to reduce processing resource usage.

In some cases, PUCCH transmissions may be transmitted according to a power control configuration, which may provide for different power control for PUCCH and PUSCH communications. In some cases, power control for PUCCH transmissions may be based on a number of power control parameters, including, for example: p0-nominal, which may provide a cell specific Po (e.g., a nominal starting power for the uplink transmissions); P_o_UE_PUCCH, which may provide a UE-specific value chosen from a set p0-Set. The p0-Set parameter may indicate a set for a CC, where a cardinality of the set is based on a maximum number of PUCCH Po's per set (e.g., maxNrofPUCCH-P0-PerSet). For each entry in the P0-Set, parameters may include {p0-PUCCH-Id, p0-PUCCH-Value}. The particular value of p0-PUCCH-Value a UE is to apply for a PUCCH transmission may be based on the particular p0-PUCCH-Id in configured spatial relation information, such as may be provided in one or multiple PUCCH-SpatialRelationInfo configurations. In some cases, a UE may be configured by RRC with multiple PUCCH-SpatialRelationInfo, and the UE may be indicated by a MAC-CE which one to use. The power control configuration may also provide a reference signal identification of a reference signal that may be used by the UE to measure a pathloss. For example, pathloss may be measured based on a pucch-PathlossReferenceRS-Id, which is indicated in the RRC parameter PUCCH-SpatialRelationInfo.

In some cases, dynamic power control may be implemented, in which a power control command is signaled in DCI. The power control command may be used to dynamically adjust PUCCH transmit power on top of Po. Two types of dynamic power control command may be used, including a Type 1 command that provides an accumulative dynamic power control command (e.g. a two bit power control command that indicates whether the UE is to increment or decrement transmit power by a configured step amount), and a Type 2 command that provides an absolute power control (e.g., an indication of transmit power). A UE can be configured with two dynamic power control loops for PUCCH transmissions (e.g., one loop for URLLC, another loop for eMBB). However, for a PUCCH, the UE may use only one loop, and which loop to use is indicated by a closedLoop-Index in RRC parameter PUCCH-SpatialRelationInfo. The UE's final transmit power may be a sum of the nominal value, the path loss, and the dynamic power control information, such that the transmit power=Po+pathloss+dynamic power control loop output. In accordance with various techniques discussed herein, such power control techniques may be used for PCC 310, the first SCC 315, the second SCC 320, or any combinations thereof, examples of which are discussed with reference to FIGS. 4A, 4B, and 5.

Figure 4A:
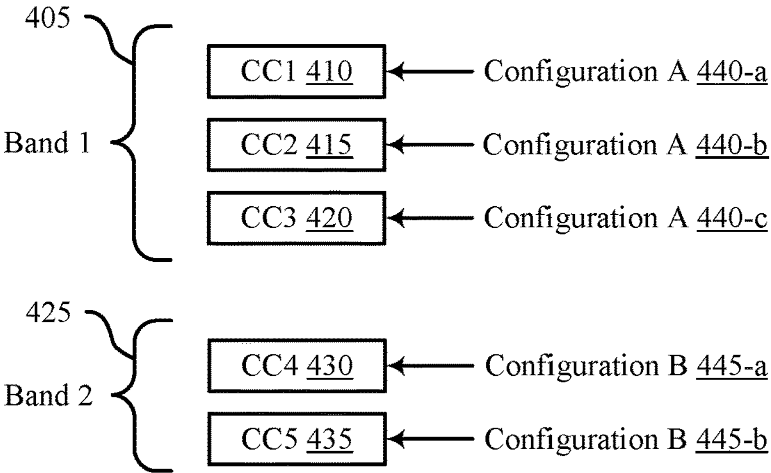
FIGS. 4A and 4B illustrate examples of power control configurations that support power control techniques for uplink control channels on multiple component carriers in accordance with aspects of the present disclosure.
Figure 4B:
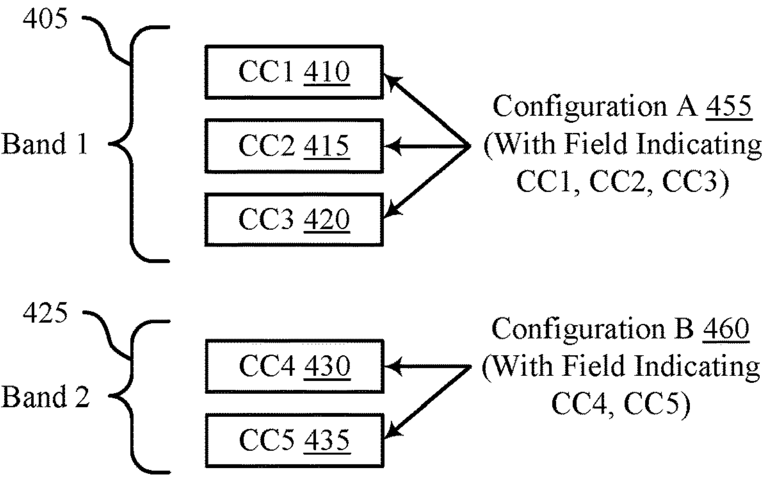

FIGS. 4A and 4B illustrate examples of power control configurations 400 and 450 that support power control techniques for uplink control channels on multiple component carriers in accordance with aspects of the present disclosure. In some examples, power control configurations 400 and 450 may implement aspects of wireless communications system 100 or 200. In these examples, a base station (e.g., a base station 105 of FIG. 1 or 2) may configure multiple CCs at a UE (e.g., a UE 115 of FIG. 1 or 2).

In the examples of FIGS. 4A and 4B, different CCs may be configured in different frequency bands (e.g., frequency range 1 (FR1) bands n1 though n98, FR2 bands n257 through n261, etc.). As illustrated in FIG. 4A, a first CC 410, a second CC 415, and a third CC 420 may be configured in a first frequency band 405, and a fourth CC 430 and a fifth CC 435 may be configured in a second frequency band 425. In this example, intra-band CCs may use a same configuration that provides a common p0-Set and a common PUCCH-SpatialRelationInfo, and CCs in different bands (e.g., in inter-band CA) may use different p0-Set per band (or per CC), use different PUCCH-SpatialRelationInfo per band (or per CC). In the examples of FIGS. 4A and 4B, the first through third CCs 410 through 420 may use configuration A, and fourth and fifth CCs 430 through 435 may use configuration B. In some cases, a base station may configure the UE with the power control configurations for configuration A and configuration B.

In the example of FIG. 4A, the base station may separately configure each CC, such that the first CC 410 is provided with configuration A 440-*a,* the second CC 415 is provided with configuration A 440-b, the third CC 420 is provided with configuration A 440-*c,* the fourth CC 430 is provided with configuration B 445-*a,* and the fifth CC 435 is provided with configuration B 445-*b.* Such configurations may be provided by RRC signaling, which may configure PUCCH-SpatialRelationInfo and p0-Set on per CC basis. In this example, for CCs in the same band (intra-band CA or same band in inter-band CA), the base station may duplicate the same PUCCH-SpatialRelationInfo and the same p0-Set for those CCs.

In the example of FIG. 4B, the base station may provide a single configuration for a particular frequency band, thus providing configuration A 455 for the first through third CCs 410 through 420 and configuration B 460 for the fourth through fifth CCs 430 through 435. In such cases, the base station may provide RRC configuration on a per-band basis (i.e., intra-band CA is reduced to a single band). In each configuration for a band, a field may be provided (e.g., in spatial relation information, or any other power control configuration information) to indicate the configuration applies to which CCs. For example, the base station may provide RRC signaling that includes a PUCCH-CC-List field in "PUCCH-Config," in "PUCCH-SpatialRelationInfo," in "PUCCH-powerControl," or in "p0-Set." Based on the power control configuration, the UE may set a transmit power for PUCCH transmissions on each of the CCs that are configured for PUCCH transmissions.

Figure 5:
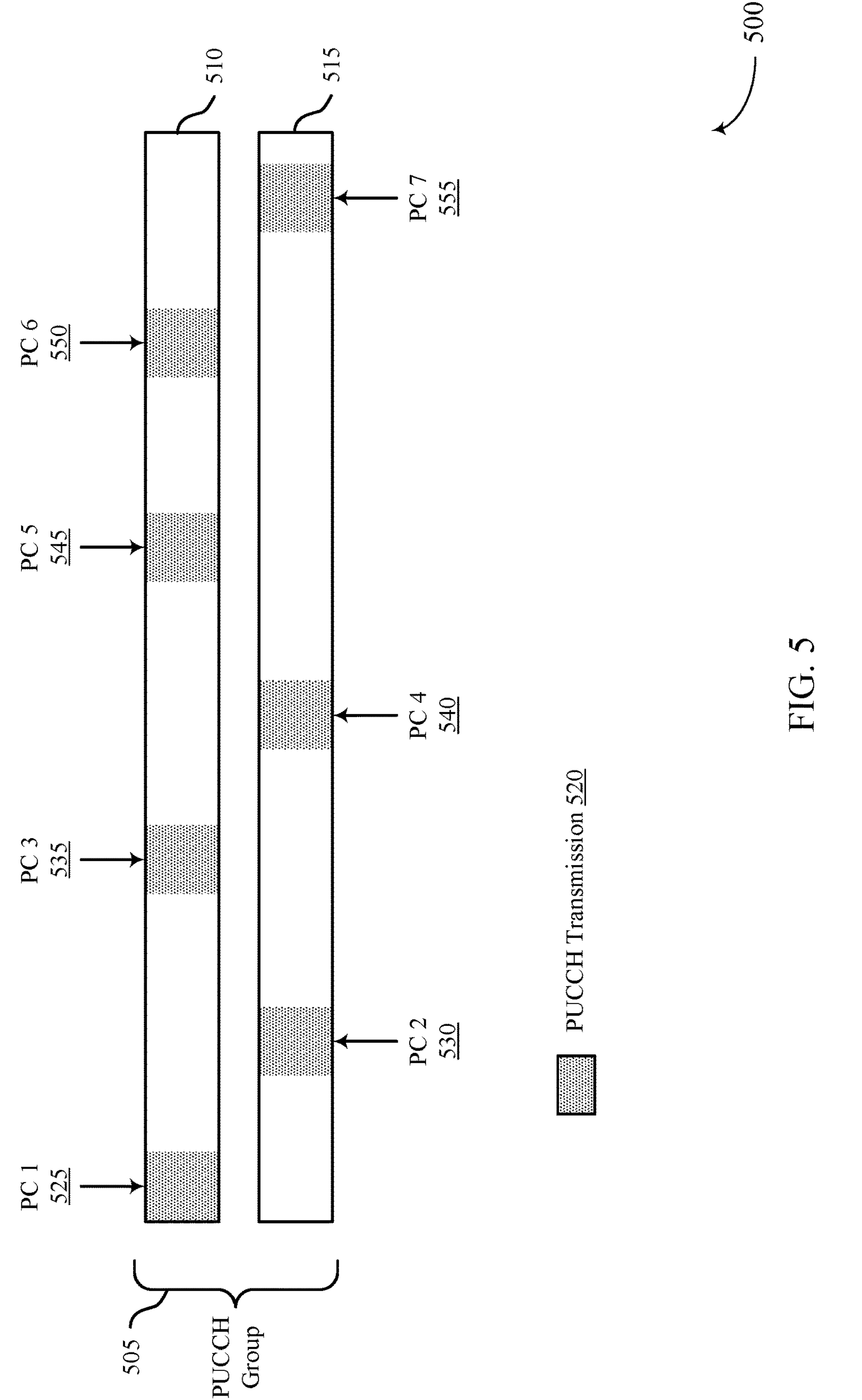
FIG. 5 illustrates an example of closed loop power control that supports power control techniques for uplink control channels on multiple component carriers in accordance with aspects of the present disclosure.

FIG. 5 illustrates an example of closed loop power control 500 that supports power control techniques for uplink control channels on multiple component carriers in accordance with aspects of the present disclosure. In some examples, closed loop power control 500 may implement aspects of wireless communications system 100 or 200. In this example, a base station (e.g., a base station 105 of FIG. 1 or 2) may configure multiple CCs at a UE (e.g., a UE 115 of FIG. 1 or 2).

In the example of FIG. 5, the base station may configure a PUCCH group 505 having a first CC 510 and a second CC 515. Further, in this case, power control commands may be used for PUCCH transmissions 520, such as a Type 1 commands that provide an accumulative dynamic power control command. In this example, a first power control command 525 may be received for the first CC 510, a second power control command 530 may be received for the second CC 515, a third power control command 535 may be received for the first CC 510, a fourth power control command 540 may be received for the second CC 515, a fifth power control command 545 and a sixth power control command 550 may be received for the first CC 510, and a seventh power control command 555 may be received for the second CC 515.

In some cases, the UE may accumulate power control commands for PUCCH across the first CC 510 and second CC 515. In such cases, the power control commands 525 through 555 may be accumulated and applied for uplink transmit power regardless of which CC a particular power control command is associated with. In some cases, such a power control accumulation technique may be used when both the first CC 510 and the second CC 515 are intra-band CCs (e.g., channel conditions for each CC are likely to be very similar). In other cases, the UE may accumulate power control commands separately for each of the first CC 510 and the second CC 515. In such cases, the first power control command 525, third power control command 535, fifth power control command 545, and sixth power control command 550 may be applied for PUCCH transmissions 520 on the first CC 510. Likewise, the second power control command 530, fourth power control command 540, and seventh power control command 555 may be applied for PUCCH transmissions 520 on the second CC 515. In some cases, such a power control accumulation technique may be used when the first CC 510 and the second CC 515 are inter-band CCs (e.g., channel conditions for each CC are likely to be different). In some cases, cross-CC power control command accumulation may be applied for any CCs that are in a same band, with separate accumulations performed for different bands. In some cases, for intra-band CA, the base station may configure the UE to perform cross-CC accumulation or to perform the accumulation separately for each CC.

Figure 6:
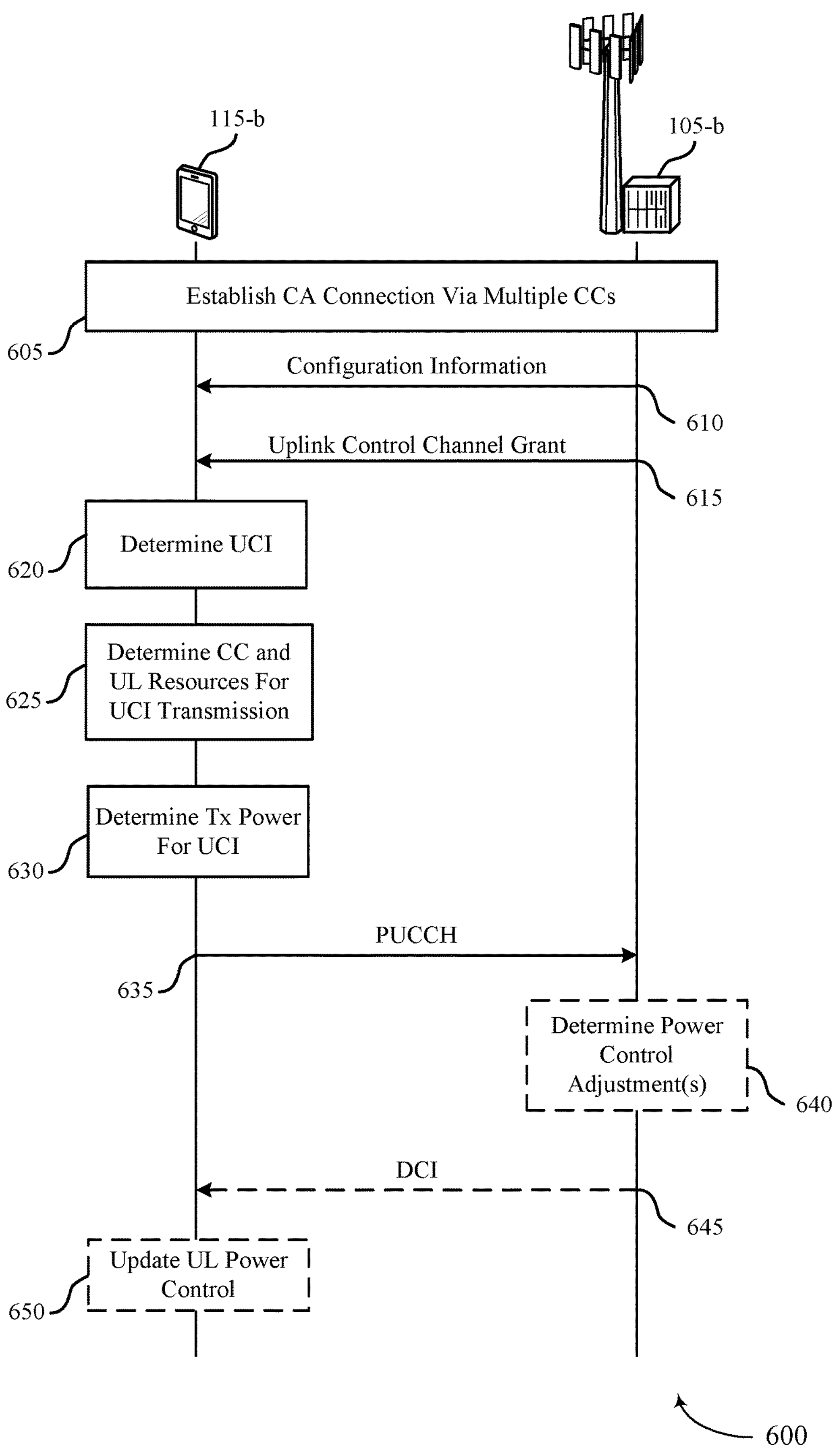
FIG. 6 illustrates an example of a process flow that supports power control techniques for uplink control channels on multiple component carriers in accordance with aspects of the present disclosure.

FIG. 6 illustrates an example of a process flow 600 that supports power control techniques for uplink control channels on multiple component carriers in accordance with aspects of the present disclosure. In some examples, the process flow 600 may implement aspects of wireless communications systems 100 and 200. The process flow 600 includes UE 115-*b,* which may be an example of a UE 115 as described with respect to FIGS. 1 and 2. The process flow 600 also includes base station 105-*b,* which may be an example of a base station 105 as described with respect to FIGS. 1 and 2. The UE 115-*b* and the base station 105-*b* may implement uplink control channel power control procedures as discussed herein.

In some examples, the operations illustrated in the process flow 600 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 605, the base station 105-*b* and UE 115-*b* may establish a connection via multiple CCs using carrier aggregation. Such a connection may be established in accordance with connection establishment techniques for a wireless communications network, such as through random access and connection establishment procedures.

At 610, the base station 105-*b* may transmit configuration information to the UE 115-*b,* which may include power control configuration information. In some cases, the power control configuration information may include one or more configurations that may be applied to uplink control channel transmissions on multiple of the CCs that are established between the UE 115-*b* and the base station 105-*b.* At 615, the base station 105-*b* may transmit an uplink control channel grant that allocates uplink resources to the UE 115-*b* for uplink control channel transmissions (e.g., UCI transmissions on PUCCH).

At 620, the UE 115-*b* may determine uplink control information that is to be transmitted to the base station 105-*b*. Such uplink control information may include, for example, HARQ feedback for one or more downlink transmissions previously transmitted by the base station 105-*b* or other transmitter.

At 625, the UE 115-*b* may determine a CC and uplink resources for the uplink control information transmission. In some cases, the UE 115-*b* may determine that a SCC is to be used for the uplink control information transmission. At 630, the UE 115-*b* may determine an uplink transmit power for the uplink control information transmission. The UE 115-*b* may determine the uplink transmit power in accordance with the various techniques as discussed herein, such as based on a power control configuration that is provided for a SCC for determining uplink transmit power for PUCCH transmissions. At 635, the UE 115-*b* may transmit the uplink control channel transmission (e.g., PUCCH transmission) that includes the uplink control information, using the determined transmit power.

Optionally, at 640, the base station 105-*b* and UE 115-*b* may perform closed-loop power control, and the base station 105-*b* may determine one or more power control adjustments based on one or more uplink communications from the UE 115-*b*. At 645, the base station 105-*b* may transmit downlink control information to the UE 115-*b* that includes an adjustment to the transmit power (e.g., a power control command). A 650, the UE 115-*b* may update the uplink power control loop based on the received adjustment from the base station 105-*b*. In some cases, the UE 115-*b* may accumulate power control commands across CCs for intra-band CCs, and accumulate inter-band power control commands separately for each different frequency band.

Figure 7:
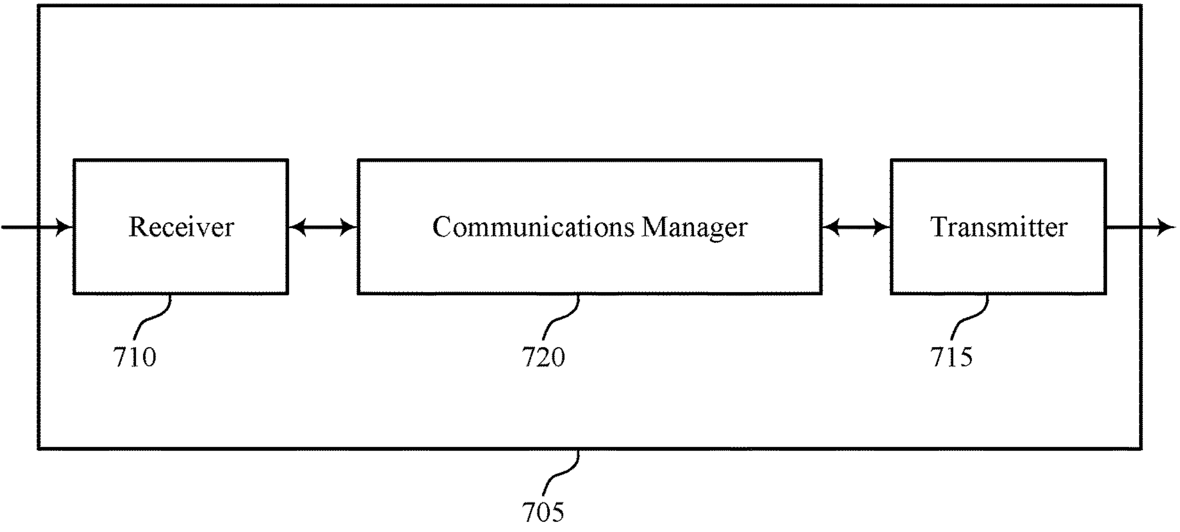
FIGS. 7 and 8 show block diagrams of devices that support power control techniques for uplink control channels on multiple component carriers in accordance with aspects of the present disclosure.

FIG. 7 shows a block diagram 700 of a device 705 that supports power control techniques for uplink control channels on multiple component carriers in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to power control techniques for uplink control channels on multiple component carriers). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to power control techniques for uplink control channels on multiple component carriers). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of power control techniques for uplink control channels on multiple component carriers as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The communications manager 720 may be configured as or otherwise support a means for transmitting a first uplink control channel communication to a base station via the primary component carrier using a first uplink transmit power that is based on the power control information. The communications manager 720 may be configured as or otherwise support a means for transmitting a second uplink control channel communication to the base station via the secondary component carrier using a second uplink transmit power that is based on the power control information.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for power control of uplink control channel communications of one or more SCCs, which may provide for more efficient utilization of communication resources and lower latency uplink control information transmissions.

Figure 8:
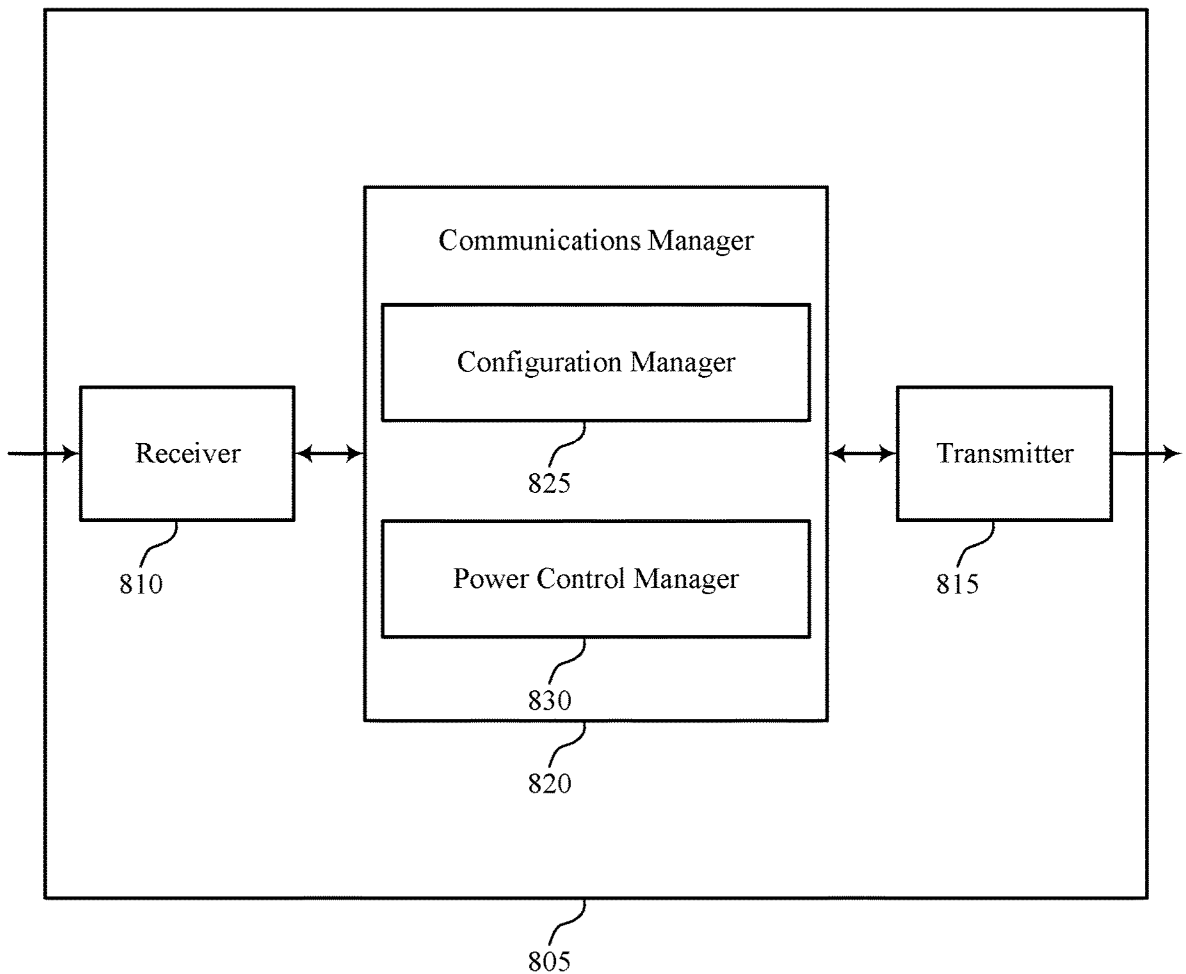

FIG. 8 shows a block diagram 800 of a device 805 that supports power control techniques for uplink control channels on multiple component carriers in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to power control techniques for uplink control channels on multiple component carriers). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to power control techniques for uplink control channels on multiple component carriers). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of power control techniques for uplink control channels on multiple component carriers as described herein. For example, the communications manager 820 may include a configuration manager 825 a power control manager 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The configuration manager 825 may be configured as or otherwise support a means for receiving an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The power control manager 830 may be configured as or otherwise support a means for transmitting a first uplink control channel communication to a base station via the primary component carrier using a first uplink transmit power that is based on the power control information. The power control manager 830 may be configured as or otherwise support a means for transmitting a second uplink control channel communication to the base station via the secondary component carrier using a second uplink transmit power that is based on the power control information.

Figure 9:
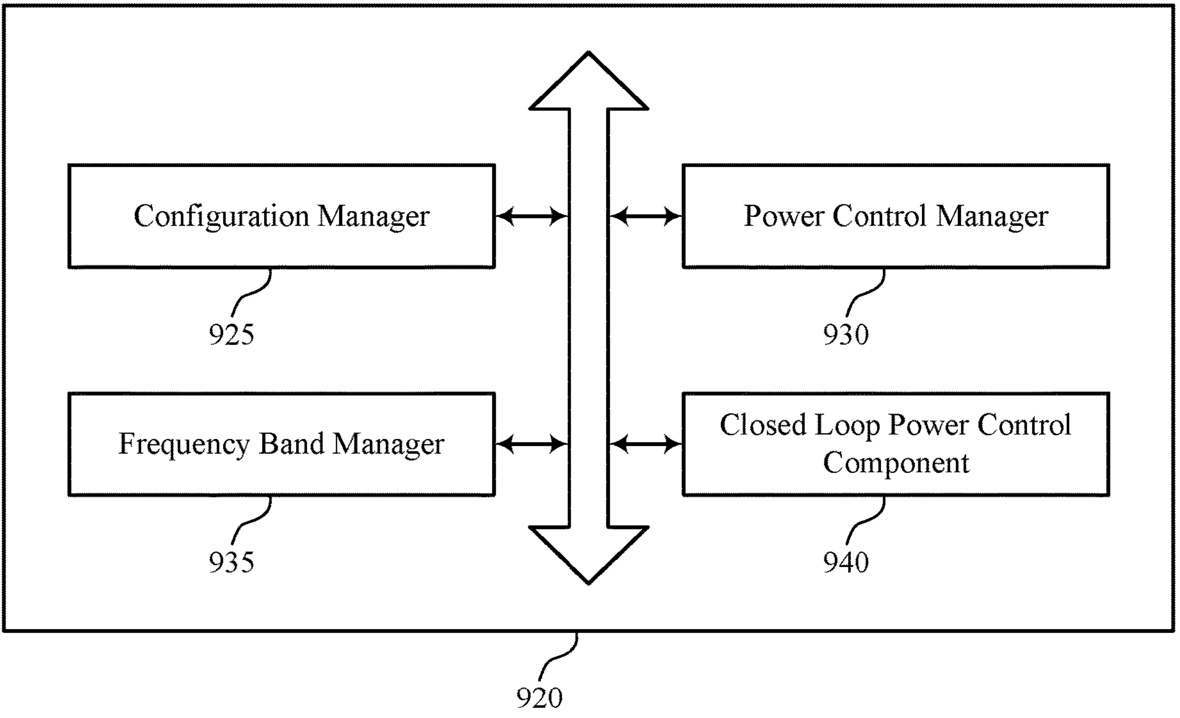
FIG. 9 shows a block diagram of a communications manager that supports power control techniques for uplink control channels on multiple component carriers in accordance with aspects of the present disclosure.

FIG. 9 shows a block diagram 900 of a communications manager 920 that supports power control techniques for uplink control channels on multiple component carriers in accordance with aspects of the present disclosure. The communications manager 920 may be an example of aspects of a communications manager 720, a communications manager 820, or both, as described herein. The communications manager 920, or various components thereof, may be an example of means for performing various aspects of power control techniques for uplink control channels on multiple component carriers as described herein. For example, the communications manager 920 may include a configuration manager 925, a power control manager 930, a frequency band manager 935, a closed loop power control component 940, or any combination thereof. Each of these components may communicate, directly or indirectly, with one another (e.g., via one or more buses).

The communications manager 920 may support wireless communication at a UE in accordance with examples as disclosed herein. The configuration manager 925 may be configured as or otherwise support a means for receiving an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The power control manager 930 may be configured as or otherwise support a means for transmitting a first uplink control channel communication to a base station via the primary component carrier using a first uplink transmit power that is based on the power control information. In some examples, the power control manager 930 may be configured as or otherwise support a means for transmitting a second uplink control channel communication to the base station via the secondary component carrier using a second uplink transmit power that is based on the power control information.

In some examples, to support receiving the uplink carrier aggregation configuration, the frequency band manager 935 may be configured as or otherwise support a means for receiving a first power control configuration for the primary component carrier and a second power control configuration for the secondary component carrier. In some cases, the first power control configuration is applied to one or more component carriers in a first frequency band and the second power control configuration is applied to one or more component carriers in a second frequency band. In some examples, the first power control configuration and the second power control configuration include parameters for p0-nominal, p0-Set, pathlossReferenceRSs, and PUCCH-SpatialRelationInfo. In some examples, the first power control configuration is received for each component carrier in the first frequency band, and the second power control configuration is received for each component carrier in the second frequency band.

In some examples, the first power control configuration and the second power control configuration are received in RRC signaling that provides uplink control channel power configuration parameters for configured component carriers. In some examples, the first power control configuration includes a first indication of one or more component carriers in the first frequency band that are to use the first power control configuration, and the second power control configuration includes a second indication of one or more component carriers in the second frequency band that are to use the second power control configuration. In some examples, the first power control configuration and the second power control configuration are received in RRC signaling that provides uplink control channel power configuration parameters and a listing of corresponding component carriers for each power control configuration.

In some examples, the closed loop power control component 940 may be configured as or otherwise support a means for receiving, from the base station, a first power control command that indicates an incremental increase or decrease in transmit power for the primary component carrier. In some examples, the closed loop power control component 940 may be configured as or otherwise support a means for receiving, from the base station, a second power control command that indicates an incremental increase or decrease in transmit power for the secondary component carrier. In some examples, the closed loop power control component 940 may be configured as or otherwise support a means for applying one or more of the first power control command or the second power control command to one or more of the primary component carrier or the secondary component carrier.

In some examples, to support applying, the frequency band manager 935 may be configured as or otherwise support a means for applying both the first power control command and the second power control command to each of the primary component carrier and the secondary component carrier (e.g., based on both of the primary component carrier and the secondary component carrier being in a same frequency band). In some examples, to support applying, the frequency band manager 935 may be configured as or otherwise support a means for applying the first power control command to the primary component carrier and the second power control command to the secondary component carrier (e.g., based on the primary component carrier and the secondary component carrier being in different frequency bands). In some examples, the closed loop power control component 940 may be configured as or otherwise support a means for receiving an indication from the base station that indicates whether to apply power control commands on a per component carrier basis or across multiple component carriers, and where one or more of the first power control command or the second power control command are applied to each component carrier based on the indication.

Figure 10:
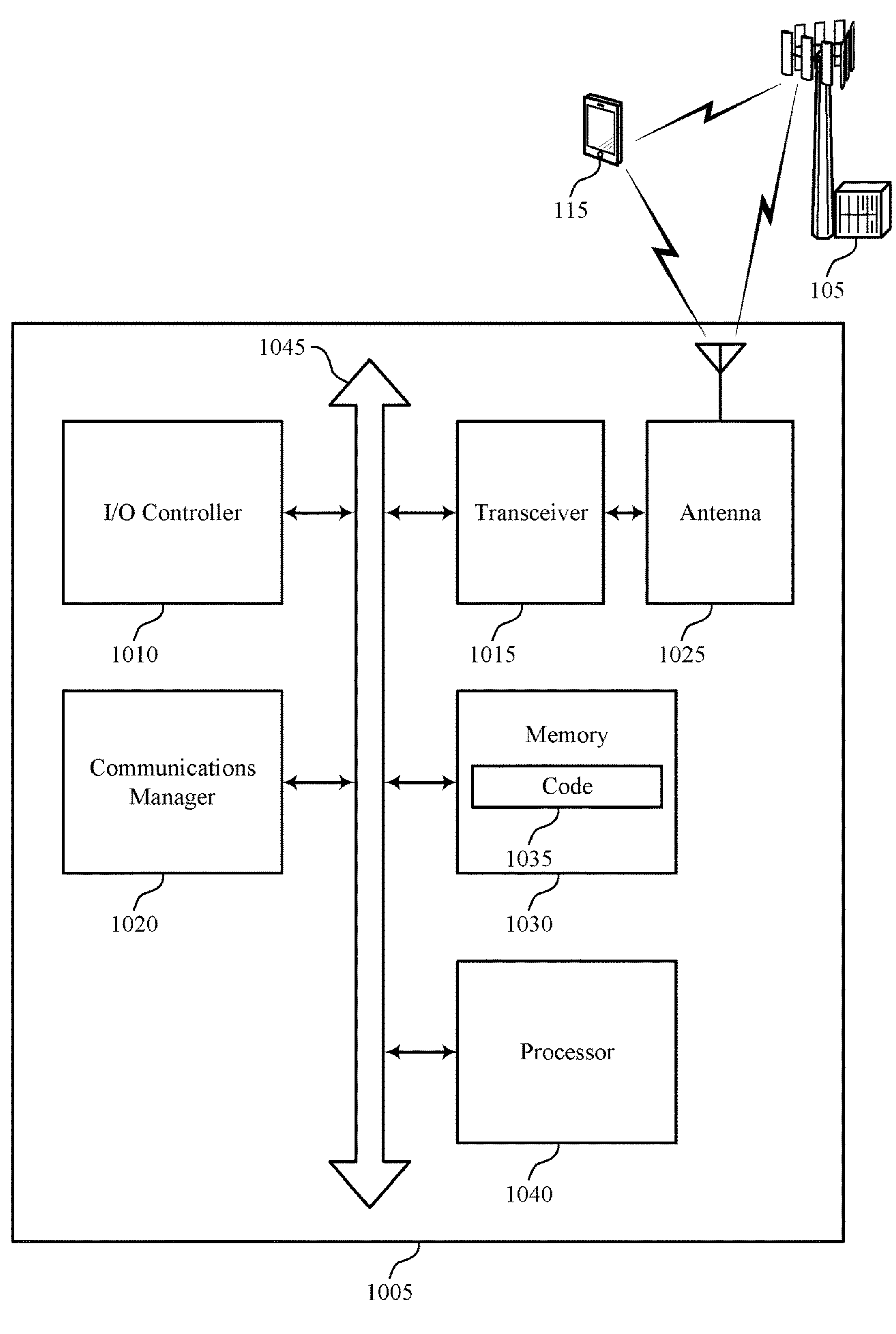
FIG. 10 shows a diagram of a system including a device that supports power control techniques for uplink control channels on multiple component carriers in accordance with aspects of the present disclosure.

FIG. 10 shows a diagram of a system 1000 including a device 1005 that supports power control techniques for uplink control channels on multiple component carriers in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting power control techniques for uplink control channels on multiple component carriers). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The communications manager 1020 may be configured as or otherwise support a means for transmitting a first uplink control channel communication to a base station via the primary component carrier using a first uplink transmit power that is based on the power control information. The communications manager 1020 may be configured as or otherwise support a means for transmitting a second uplink control channel communication to the base station via the secondary component carrier using a second uplink transmit power that is based on the power control information.

By including or configuring the communications manager 1020 in accordance with examples as described herein, the device 1005 may support techniques for power control of uplink control channel communications of one or more SCCs, which may provide for more efficient utilization of communication resources, lower latency uplink control information transmissions, and improved communication reliability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of power control techniques for uplink control channels on multiple component carriers as described herein, or the processor 1040 and the memory 1030 may be otherwise configured to perform or support such operations.

Figure 11:
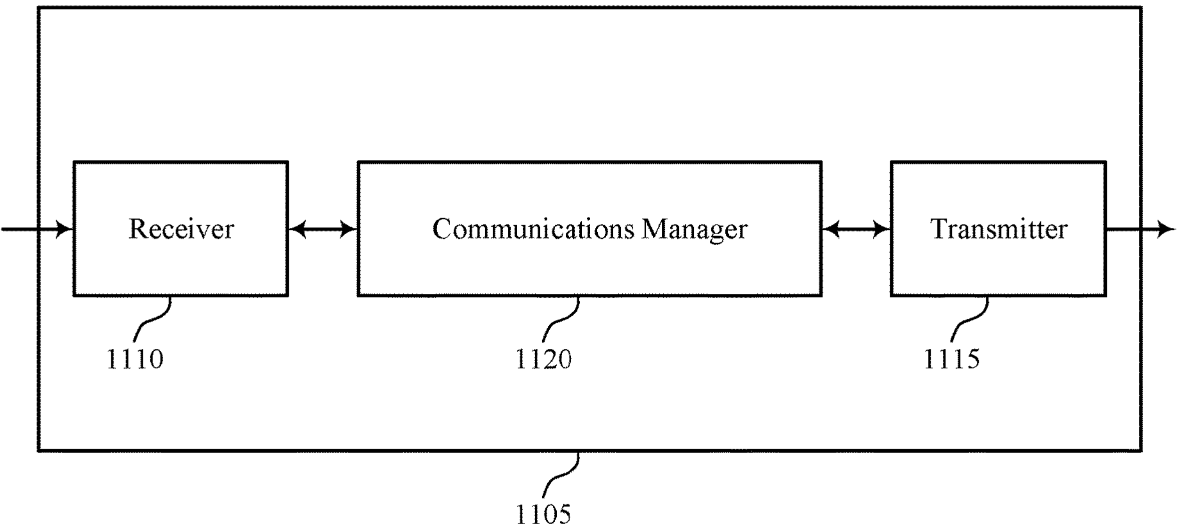

FIG. 11 shows a block diagram 1100 of a device 1105 that supports power control techniques for uplink control channels on multiple component carriers in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to power control techniques for uplink control channels on multiple component carriers). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to power control techniques for uplink control channels on multiple component carriers). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of power control techniques for uplink control channels on multiple component carriers as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The communications manager 1120 may be configured as or otherwise support a means for receiving a first uplink control channel communication from the UE via the primary component carrier, where a first uplink transmit power of the first uplink control channel communication is based on the power control information. The communications manager 1120 may be configured as or otherwise support a means for receiving a second uplink control channel communication from the UE via the secondary component carrier, where a second uplink transmit power of the second uplink control channel communication is based on the power control information.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for power control of uplink control channel communications of one or more SCCs, which may provide for more efficient utilization of communication resources and lower latency uplink control information transmissions.

FIG. 12 shows a block diagram 1200 of a device 1205 that supports power control techniques for uplink control channels on multiple component carriers in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to power control techniques for uplink control channels on multiple component carriers). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to power control techniques for uplink control channels on multiple component carriers). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of power control techniques for uplink control channels on multiple component carriers as described herein. For example, the communications manager 1220 may include a configuration manager 1225 a power control manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The configuration manager 1225 may be configured as or otherwise support a means for transmitting, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The power control manager 1230 may be configured as or otherwise support a means for receiving a first uplink control channel communication from the UE via the primary component carrier, where a first uplink transmit power of the first uplink control channel communication is based on the power control information. The power control manager 1230 may be configured as or otherwise support a means for receiving a second uplink control channel communication from the UE via the secondary component carrier, where a second uplink transmit power of the second uplink control channel communication is based on the power control information.

Figure 13:
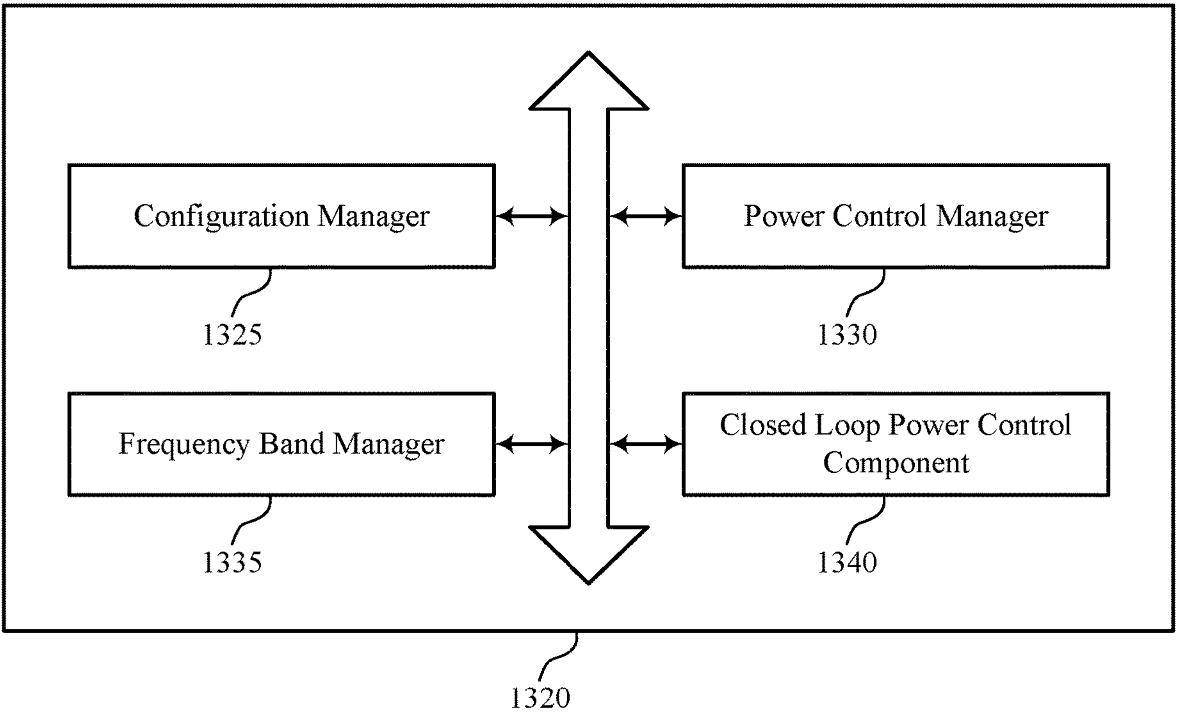
FIG. 13 shows a block diagram of a communications manager that supports power control techniques for uplink control channels on multiple component carriers in accordance with aspects of the present disclosure.

FIG. 13 shows a block diagram 1300 of a communications manager 1320 that supports power control techniques for uplink control channels on multiple component carriers in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of power control techniques for uplink control channels on multiple component carriers as described herein. For example, the communications manager 1320 may include a configuration manager 1325, a power control manager 1330, a frequency band manager 1335, a closed loop power control component 1340, or any combination thereof. Each of these components may communicate, directly or indirectly, with one another (e.g., via one or more buses).

The communications manager 1320 may support wireless communication at a base station in accordance with examples as disclosed herein. The configuration manager 1325 may be configured as or otherwise support a means for transmitting, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The power control manager 1330 may be configured as or otherwise support a means for receiving a first uplink control channel communication from the UE via the primary component carrier, where a first uplink transmit power of the first uplink control channel communication is based on the power control information. In some examples, the power control manager 1330 may be configured as or otherwise support a means for receiving a second uplink control channel communication from the UE via the secondary component carrier, where a second uplink transmit power of the second uplink control channel communication is based on the power control information.

In some examples, to support transmitting the uplink carrier aggregation configuration, the frequency band manager 1335 may be configured as or otherwise support a means for transmitting a first power control configuration for the primary component carrier and a second power control configuration for the secondary component carrier. In some cases, the first power control configuration is applied to one or more component carriers in a first frequency band and the second power control configuration is applied to one or more component carriers in a second frequency band. In some examples, the first power control configuration is provided for each component carrier in the first frequency band, and the second power control configuration is provided for each component carrier in the second frequency band. In some examples, the first power control configuration and the second power control configuration are provided in RRC signaling that provides uplink control channel power configuration parameters for configured component carriers. In some examples, the first power control configuration includes a first indication of one or more component carriers in the first frequency band that are to use the first power control configuration, and the second power control configuration includes a second indication of one or more component carriers in the second frequency band that are to use the second power control configuration. In some examples, the first power control configuration and the second power control configuration are provided in RRC signaling that provides uplink control channel power configuration parameters and a listing of corresponding component carriers for each power control configuration.

In some examples, the closed loop power control component 1340 may be configured as or otherwise support a means for transmitting, to the UE, a first power control command that indicates an incremental increase or decrease in transmit power for the primary component carrier. In some examples, the closed loop power control component 1340 may be configured as or otherwise support a means for transmitting, to the UE, a second power control command that indicates an incremental increase or decrease in transmit power for the secondary component carrier. In some examples, the closed loop power control component 1340 may be configured as or otherwise support a means for where the UE is configured to apply one or more of the first power control command or the second power control command to one or more of the primary component carrier or the secondary component carrier.

In some examples, the frequency band manager 1335 may be configured as or otherwise support a means for configuring the UE to apply both the first power control command and the second power control command to each of the primary component carrier and the secondary component carrier (e.g., based on both of the primary component carrier and the secondary component carrier being in a same frequency band). In some examples, the frequency band manager 1335 may be configured as or otherwise support a means for configuring the UE to apply the first power control command to the primary component carrier and the second power control command to the secondary component carrier (e.g., based on the primary component carrier and the secondary component carrier being in different frequency bands). In some examples, the closed loop power control component 1340 may be configured as or otherwise support a means for transmitting an indication to the UE that indicates whether to apply power control commands on a per component carrier basis or across multiple component carriers.

Figure 14:
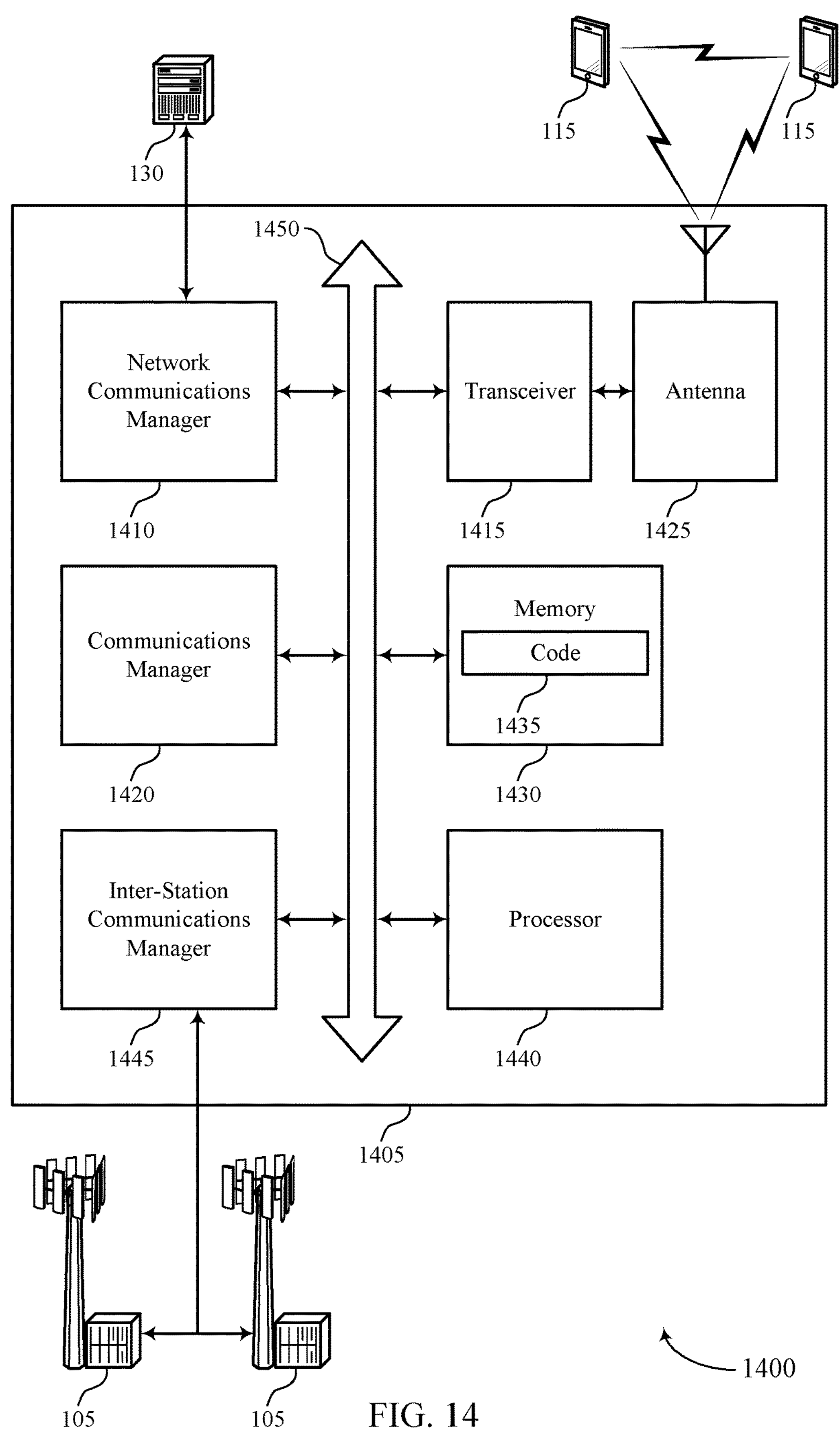
FIG. 14 shows a diagram of a system including a device that supports power control techniques for uplink control channels on multiple component carriers in accordance with aspects of the present disclosure.

FIG. 14 shows a diagram of a system 1400 including a device 1405 that supports power control techniques for uplink control channels on multiple component carriers in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting power control techniques for uplink control channels on multiple component carriers). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The communications manager 1420 may be configured as or otherwise support a means for receiving a first uplink control channel communication from the UE via the primary component carrier, where a first uplink transmit power of the first uplink control channel communication is based on the power control information. The communications manager 1420 may be configured as or otherwise support a means for receiving a second uplink control channel communication from the UE via the secondary component carrier, where a second uplink transmit power of the second uplink control channel communication is based on the power control information.

By including or configuring the communications manager 1420 in accordance with examples as described herein, the device 1405 may support techniques for power control of uplink control channel communications of one or more SCCs, which may provide for more efficient utilization of communication resources, lower latency uplink control information transmissions, and improved communication reliability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of power control techniques for uplink control channels on multiple component carriers as described herein, or the processor 1440 and the memory 1430 may be otherwise configured to perform or support such operations.

Figure 15:
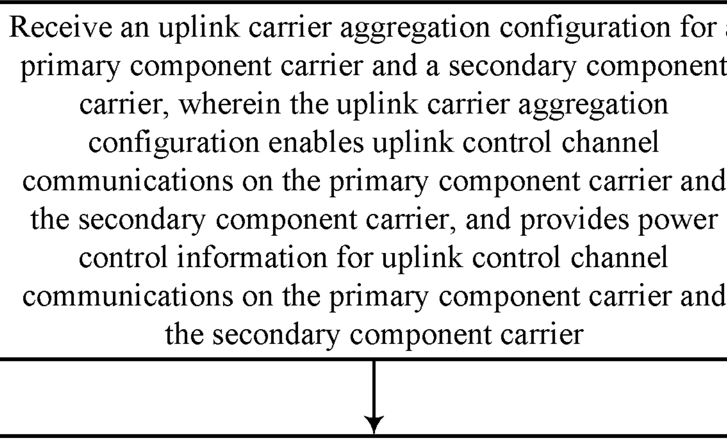

FIG. 15 shows a flowchart illustrating a method 1500 that supports power control techniques for uplink control channels on multiple component carriers in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The operations of 1505 may be performed in accordance with examples as disclosed herein. In some examples, aspects of the operations of 1505 may be performed by a configuration manager 925 as described with reference to FIG. 9.

At 1510, the method may include transmitting a first uplink control channel communication to a base station via the primary component carrier using a first uplink transmit power that is based on the power control information. The operations of 1510 may be performed in accordance with examples as disclosed herein. In some examples, aspects of the operations of 1510 may be performed by a power control manager 930 as described with reference to FIG. 9.

At 1515, the method may include transmitting a second uplink control channel communication to the base station via the secondary component carrier using a second uplink transmit power that is based on the power control information. The operations of 1515 may be performed in accordance with examples as disclosed herein. In some examples, aspects of the operations of 1515 may be performed by a power control manager 930 as described with reference to FIG. 9.

Figure 16:
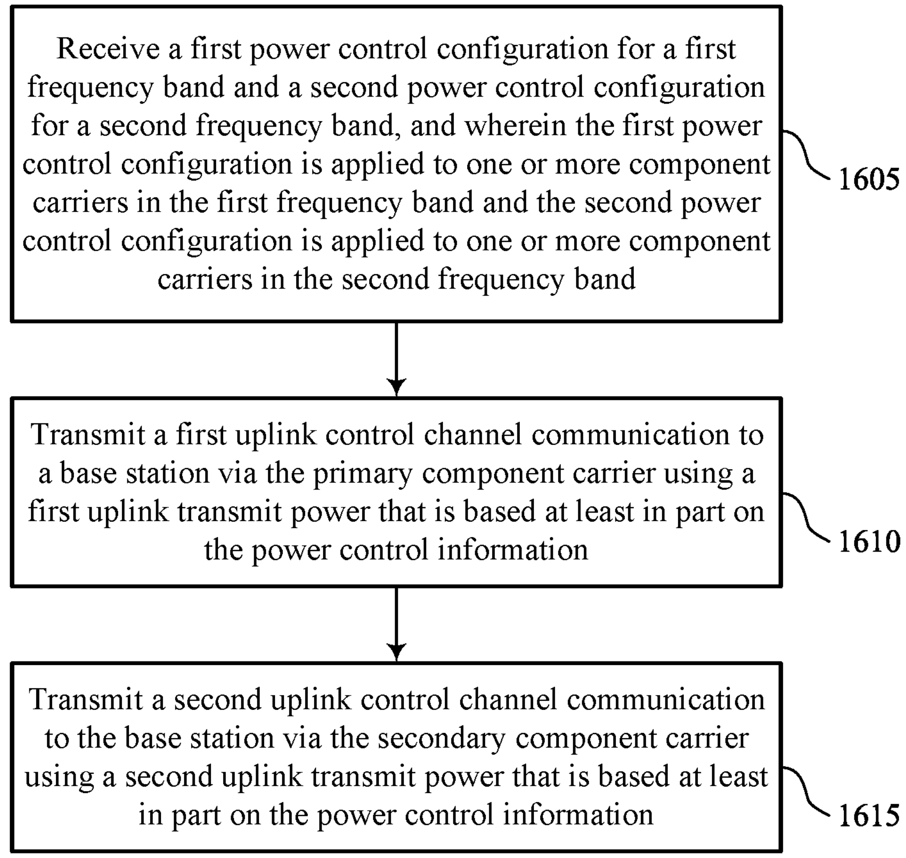

FIG. 16 shows a flowchart illustrating a method 1600 that supports power control techniques for uplink control channels on multiple component carriers in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving a first power control configuration for a first frequency band and a second power control configuration for a second frequency band, and where the first power control configuration is applied to one or more component carriers in the first frequency band and the second power control configuration is applied to one or more component carriers in the second frequency band. The operations of 1605 may be performed in accordance with examples as disclosed herein. In some examples, aspects of the operations of 1605 may be performed by a frequency band manager 935 as described with reference to FIG. 9.

At 1610, the method may include transmitting a first uplink control channel communication to a base station via the primary component carrier using a first uplink transmit power that is based on the power control information. The operations of 1610 may be performed in accordance with examples as disclosed herein. In some examples, aspects of the operations of 1610 may be performed by a power control manager 930 as described with reference to FIG. 9.

At 1615, the method may include transmitting a second uplink control channel communication to the base station via the secondary component carrier using a second uplink transmit power that is based on the power control information. The operations of 1615 may be performed in accordance with examples as disclosed herein. In some examples, aspects of the operations of 1615 may be performed by a power control manager 930 as described with reference to FIG. 9.

Figure 17:
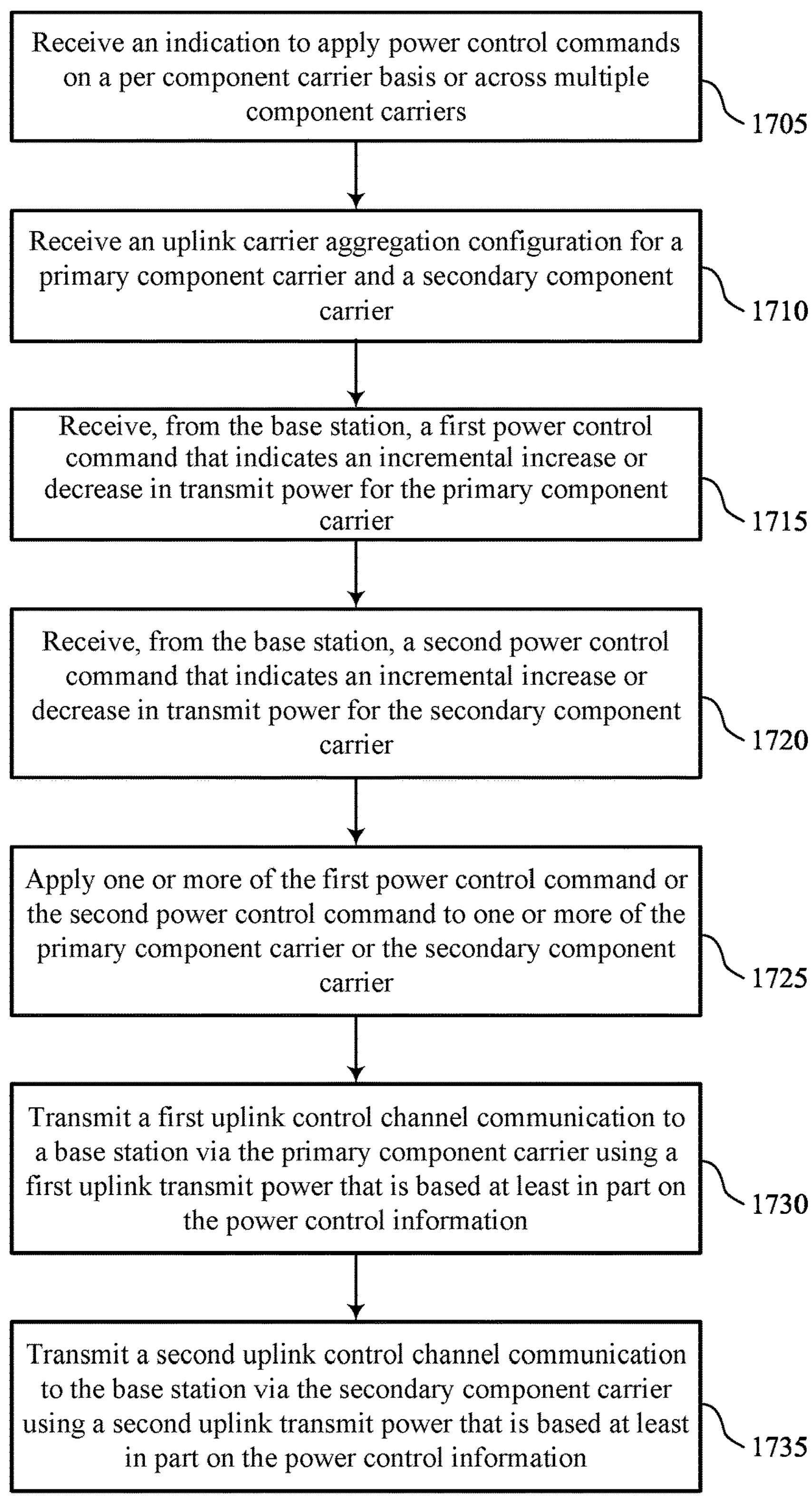

FIG. 17 shows a flowchart illustrating a method 1700 that supports power control techniques for uplink control channels on multiple component carriers in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving an indication from the base station that indicates whether to apply power control commands on a per component carrier basis or across multiple component carriers. The operations of 1705 may be performed in accordance with examples as disclosed herein. In some examples, aspects of the operations of 1705 may be performed by a closed loop power control component 940 as described with reference to FIG. 9.

At 1710, the method may include receiving an uplink carrier aggregation configuration for a primary component carrier and a secondary component carrier. The operations of 1710 may be performed in accordance with examples as disclosed herein. In some examples, aspects of the operations of 1710 may be performed by a configuration manager 925 as described with reference to FIG. 9. In some case, the uplink carrier aggregation configuration enables uplink control channel communications on the primary component carrier and the secondary component carrier, and provides power control information for uplink control channel communications on the primary component carrier and the secondary component carrier At 1715, the method may include receiving, from the base station, a first power control command that indicates an incremental increase or decrease in transmit power for the primary component carrier. The operations of 1715 may be performed in accordance with examples as disclosed herein. In some examples, aspects of the operations of 1715 may be performed by a closed loop power control component 940 as described with reference to FIG. 9.

At 1720, the method may include receiving, from the base station, a second power control command that indicates an incremental increase or decrease in transmit power for the secondary component carrier. The operations of 1720 may be performed in accordance with examples as disclosed herein. In some examples, aspects of the operations of 1720 may be performed by a closed loop power control component 940 as described with reference to FIG. 9.

At 1725, the method may include applying one or more of the first power control command or the second power control command to one or more of the primary component carrier or the secondary component carrier. The operations of 1725 may be performed in accordance with examples as disclosed herein. In some examples, aspects of the operations of 1725 may be performed by a closed loop power control component 940 as described with reference to FIG. 9. In some cases, both the first power control command and the second power control command are applied to each of the primary component carrier and the secondary component carrier based on both of the primary component carrier and the secondary component carrier being in a same frequency band. In some cases, the first power control command is applied to the primary component carrier and the second power control command is applied to the secondary component carrier based on the primary component carrier and the secondary component carrier being in different frequency bands.

At 1730, the method may include transmitting a first uplink control channel communication to a base station via the primary component carrier using a first uplink transmit power that is based on the power control information. The operations of 1730 may be performed in accordance with examples as disclosed herein. In some examples, aspects of the operations of 1730 may be performed by a power control manager 930 as described with reference to FIG. 9.

At 1735, the method may include transmitting a second uplink control channel communication to the base station via the secondary component carrier using a second uplink transmit power that is based on the power control information. The operations of 1735 may be performed in accordance with examples as disclosed herein. In some examples, aspects of the operations of 1735 may be performed by a power control manager 930 as described with reference to FIG. 9.

FIG. 18 shows a flowchart illustrating a method 1800 that supports power control techniques for uplink control channels on multiple component carriers in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The operations of 1805 may be performed in accordance with examples as disclosed herein. In some examples, aspects of the operations of 1805 may be performed by a configuration manager 1325 as described with reference to FIG. 13.

At 1810, the method may include receiving a first uplink control channel communication from the UE via the primary component carrier, where a first uplink transmit power of the first uplink control channel communication is based on the power control information. The operations of 1810 may be performed in accordance with examples as disclosed herein. In some examples, aspects of the operations of 1810 may be performed by a power control manager 1330 as described with reference to FIG. 13.

At 1815, the method may include receiving a second uplink control channel communication from the UE via the secondary component carrier, where a second uplink transmit power of the second uplink control channel communication is based on the power control information. The operations of 1815 may be performed in accordance with examples as disclosed herein. In some examples, aspects of the operations of 1815 may be performed by a power control manager 1330 as described with reference to FIG. 13.

FIG. 19 shows a flowchart illustrating a method 1900 that supports power control techniques for uplink control channels on multiple component carriers in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting a first power control configuration for a first frequency band and a second power control configuration for a second frequency band, and where the first power control configuration is applied to one or more component carriers in the first frequency band and the second power control configuration is applied to one or more component carriers in the second frequency band. The operations of 1905 may be performed in accordance with examples as disclosed herein. In some examples, aspects of the operations of 1905 may be performed by a frequency band manager 1335 as described with reference to FIG. 13.

At 1910, the method may include receiving a first uplink control channel communication from the UE via the primary component carrier, where a first uplink transmit power of the first uplink control channel communication is based on the power control information. The operations of 1910 may be performed in accordance with examples as disclosed herein. In some examples, aspects of the operations of 1910 may be performed by a power control manager 1330 as described with reference to FIG. 13.

At 1915, the method may include receiving a second uplink control channel communication from the UE via the secondary component carrier, where a second uplink transmit power of the second uplink control channel communication is based on the power control information. The operations of 1915 may be performed in accordance with examples as disclosed herein. In some examples, aspects of the operations of 1915 may be performed by a power control manager 1330 as described with reference to FIG. 13.

Figure 20:
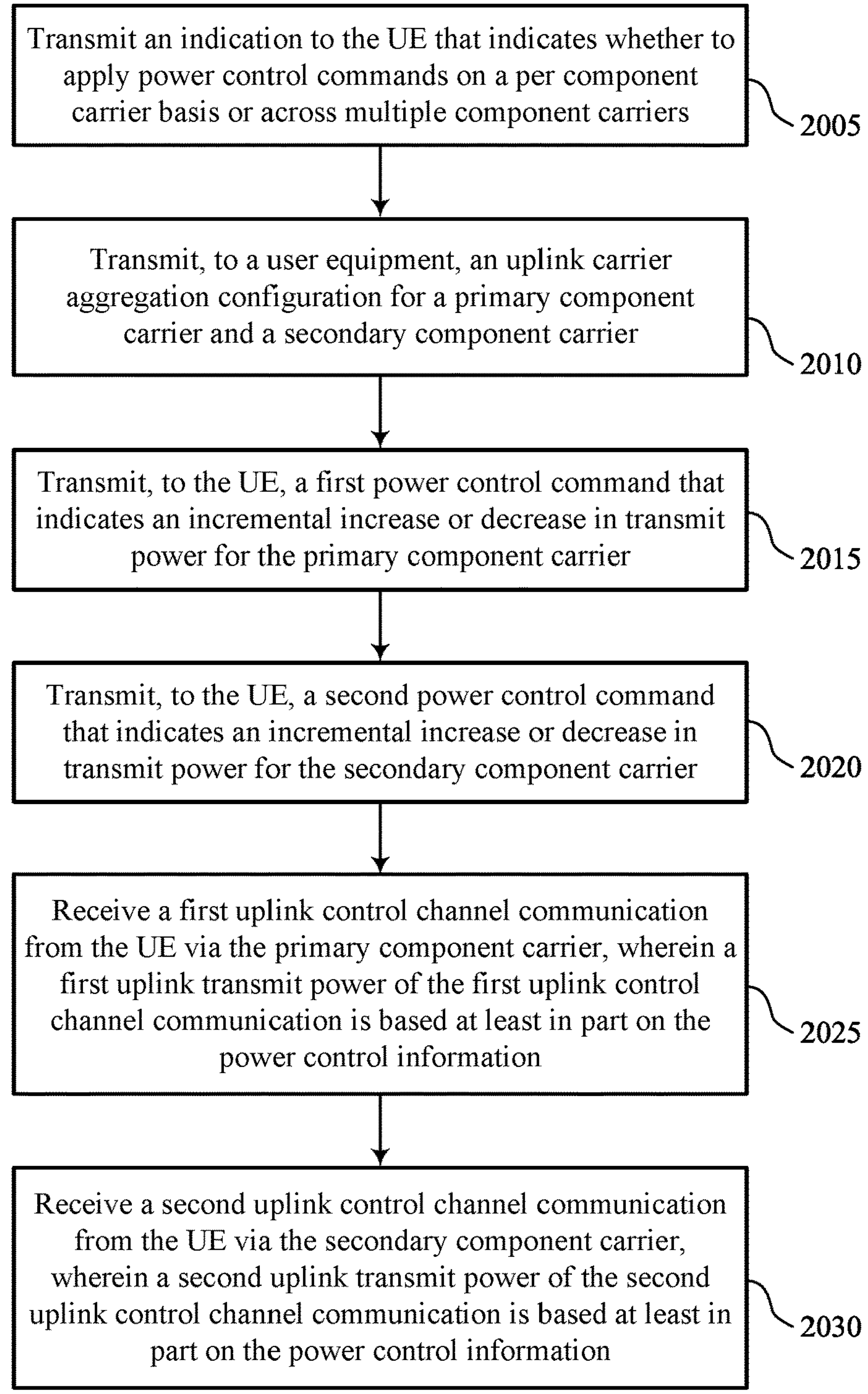

FIG. 20 shows a flowchart illustrating a method 2000 that supports power control techniques for uplink control channels on multiple component carriers in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting an indication to the UE that indicates whether to apply power control commands on a per component carrier basis or across multiple component carriers. The operations of 2005 may be performed in accordance with examples as disclosed herein. In some examples, aspects of the operations of 2005 may be performed by a closed loop power control component 1340 as described with reference to FIG. 13. In some cases, the UE may be configured to apply both the first power control command and the second power control command to each of the primary component carrier and the secondary component carrier based on both of the primary component carrier and the secondary component carrier being in a same frequency band. In some cases, the UE may be configured to apply the first power control command to the primary component carrier and the second power control command to the secondary component carrier based on the primary component carrier and the secondary component carrier being in different frequency bands.

At 2010, the method may include transmitting, to a user equipment, an uplink carrier aggregation configuration for a primary component carrier and a secondary component carrier, where the uplink carrier aggregation configuration enables uplink control channel communications on the primary component carrier and the secondary component carrier, and provides power control information for uplink control channel communications on the primary component carrier and the secondary component carrier. The operations of 2010 may be performed in accordance with examples as disclosed herein. In some examples, aspects of the operations of 2010 may be performed by a configuration manager 1325 as described with reference to FIG. 13.

At 2015, the method may include transmitting, to the UE, a first power control command that indicates an incremental increase or decrease in transmit power for the primary component carrier. The operations of 2015 may be performed in accordance with examples as disclosed herein. In some examples, aspects of the operations of 2015 may be performed by a closed loop power control component 1340 as described with reference to FIG. 13.

At 2020, the method may include transmitting, to the UE, a second power control command that indicates an incremental increase or decrease in transmit power for the secondary component carrier. The operations of 2020 may be performed in accordance with examples as disclosed herein. In some examples, aspects of the operations of 2020 may be performed by a closed loop power control component 1340 as described with reference to FIG. 13. In some cases, the UE is configured to apply one or more of the first power control command or the second power control command to one or more of the primary component carrier or the secondary component carrier.

At 2025, the method may include receiving a first uplink control channel communication from the UE via the primary component carrier, where a first uplink transmit power of the first uplink control channel communication is based on the power control information. The operations of 2025 may be performed in accordance with examples as disclosed herein. In some examples, aspects of the operations of 2025 may be performed by a power control manager 1330 as described with reference to FIG. 13.

At 2030, the method may include receiving a second uplink control channel communication from the UE via the secondary component carrier, where a second uplink transmit power of the second uplink control channel communication is based on the power control information. The operations of 2030 may be performed in accordance with examples as disclosed herein. In some examples, aspects of the operations of 2030 may be performed by a power control manager 1330 as described with reference to FIG. 13.

The following provides an overview of aspects of the present disclosure:

Aspect 1: A method for wireless communication at a UE, comprising: receiving an uplink carrier aggregation configuration for a primary component carrier and a secondary component carrier, wherein the uplink carrier aggregation configuration enables uplink control channel communications on the primary component carrier and the secondary component carrier, and provides power control information for uplink control channel communications on the primary component carrier and the secondary component carrier; transmitting a first uplink control channel communication to a base station via the primary component carrier using a first uplink transmit power that is based at least in part on the power control information; and transmitting a second uplink control channel communication to the base station via the secondary component carrier using a second uplink transmit power that is based at least in part on the power control information.

Aspect 2: The method of aspect 1, wherein the receiving the uplink carrier aggregation configuration comprises: receiving a first power control configuration for the primary component carrier and a second power control configuration for the secondary component carrier.

Aspect 3: The method of aspect 2, wherein the first power control configuration and the second power control configuration include parameters for p0-nominal, p0-Set, pathlossReferenceRSs, and PUCCH-SpatialRelationInfo.

Aspect 4: The method of any of aspects 2 through 3, wherein the first power control configuration is received for each component carrier in a first group of component carriers, and the second power control configuration is received for each component carrier in a second group of component carriers.

Aspect 5: The method of aspect 4, wherein the first power control configuration and the second power control configuration are received in RRC signaling that provides uplink control channel power configuration parameters for configured component carriers.

Aspect 6: The method of any of aspects 2 through 5, wherein the first power control configuration includes a first indication of one or more component carriers in a first frequency band that are to use the first power control configuration, and the second power control configuration includes a second indication of one or more component carriers in a second frequency band that are to use the second power control configuration.

Aspect 7: The method of aspect 1, further comprising: receiving, from the base station, a first power control command that indicates an incremental increase or decrease in transmit power for the primary component carrier; receiving, from the base station, a second power control command that indicates an incremental increase or decrease in transmit power for the secondary component carrier; and applying one or more of the first power control command or the second power control command to one or more of the primary component carrier or the secondary component carrier.

Aspect 8: The method of aspect 7, wherein the applying further comprises: applying both the first power control command and the second power control command to each of the primary component carrier and the secondary component carrier.

Aspect 9: The method of any of aspect 7, wherein the applying further comprises: applying the first power control command to the primary component carrier and the second power control command to the secondary component carrier.

Aspect 10: The method of any of aspects 7 through 9, further comprising: accumulating the incremental increase or decrease in transmit power from the power control commands separately for each configured component carrier, or across two or more configured component carriers.

Aspect 11: The method of any of aspects 7 through 10, further comprising: receiving an indication from the base station that indicates whether to apply power control commands on a per component carrier basis or across multiple component carriers.

Aspect 12: The method of any of aspects 1 through 11, wherein the primary component carrier corresponds to a primary cell (PCell) and the secondary component carrier corresponds to a secondary cell (SCell) in the uplink carrier aggregation configuration.

Aspect 13: A method for wireless communication at a base station, comprising: transmitting, to a user equipment, an uplink carrier aggregation configuration for a primary component carrier and a secondary component carrier, wherein the uplink carrier aggregation configuration enables uplink control channel communications on the primary component carrier and the secondary component carrier, and provides power control information for uplink control channel communications on the primary component carrier and the secondary component carrier; receiving a first uplink control channel communication from the UE via the primary component carrier, wherein a first uplink transmit power of the first uplink control channel communication is based at least in part on the power control information; and receiving a second uplink control channel communication from the UE via the secondary component carrier, wherein a second uplink transmit power of the second uplink control channel communication is based at least in part on the power control information.

Aspect 14: The method of aspect 13, wherein the transmitting the uplink carrier aggregation configuration comprises: transmitting a first power control configuration for the primary component carrier and a second power control configuration for the secondary component carrier.

Aspect 15: The method of aspect 14, wherein the first power control configuration is provided for each component carrier in a first group of component carriers, and the second power control configuration is provided for each component carrier in a second group of component carriers.

Aspect 16: The method of aspects 14 through 15, wherein the first power control configuration and the second power control configuration are provided in RRC signaling that provides uplink control channel power configuration parameters for configured component carriers.

Aspect 17: The method of any of aspects 14 through 16, wherein the first power control configuration includes a first indication of one or more component carriers in a first frequency band that are to use the first power control configuration, and the second power control configuration includes a second indication of one or more component carriers in a second frequency band that are to use the second power control configuration.

Aspect 18: The method of aspect 13, further comprising: transmitting, to the UE, a first power control command that indicates an incremental increase or decrease in transmit power for the primary component carrier; transmitting, to the UE, a second power control command that indicates an incremental increase or decrease in transmit power for the secondary component carrier; and wherein the UE is configured to apply one or more of the first power control command or the second power control command to one or more of the primary component carrier or the secondary component carrier.

Aspect 19: The method of aspect 18, further comprising: configuring the UE to apply both the first power control command and the second power control command to each of the primary component carrier and the secondary component carrier.

Aspect 20: The method of any of aspect 18, further comprising: configuring the UE to apply the first power control command to the primary component carrier and the second power control command to the secondary component carrier.

Aspect 21: The method of any of aspects 18 through 20, further comprising: transmitting an indication to the UE that indicates whether to apply power control commands on a per component carrier basis or across multiple component carriers.

Aspect 22: The method of any of aspects 13 through 21, wherein the primary component carrier corresponds to a primary cell (PCell) and the secondary component carrier corresponds to a secondary cell (SCell) in the uplink carrier aggregation configuration.

Aspect 23: An apparatus for wireless communication at a UE, comprising a processor; memory coupled with the processor; and instructions stored in the memory and executable by the processor to cause the apparatus to perform a method of any of aspects 1 through 12.

Aspect 24: An apparatus for wireless communication at a UE, comprising at least one means for performing a method of any of aspects 1 through 12.

Aspect 25: A non-transitory computer-readable medium storing code for wireless communication at a UE, the code comprising instructions executable by a processor to perform a method of any of aspects 1 through 12.

Aspect 26: An apparatus for wireless communication at a base station, comprising a processor; memory coupled with the processor; and instructions stored in the memory and executable by the processor to cause the apparatus to perform a method of any of aspects 13 through 22.

Aspect 27: An apparatus for wireless communication at a base station, comprising at least one means for performing a method of any of aspects 13 through 22.

Aspect 28: A non-transitory computer-readable medium storing code for wireless communication at a base station, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving an uplink carrier aggregation configuration for a primary component carrier and a secondary component carrier, wherein the primary component carrier and the secondary component carrier are in a first physical uplink control channel group, and wherein the uplink carrier aggregation configuration enables uplink control channel communications on the primary component carrier and the secondary component carrier, and provides power control information for uplink control channel communications on the primary component carrier and the secondary component carrier;

receiving, from a network entity, one or more first power control commands that each indicate an incremental stepwise decrease in uplink transmit power for the primary component carrier;

receiving, from the network entity, one or more second power control commands that each indicate an incremental stepwise decrease in uplink transmit power for the secondary component carrier;

transmitting a first uplink control channel communication via the primary component carrier using a first uplink transmit power, wherein the first uplink transmit power is based at least in part on the power control information and accumulation of each of the one or more first power control commands; and transmitting a second uplink control channel communication via the secondary component carrier using a second uplink transmit power, wherein the second uplink transmit power is based at least in part on the power control information and accumulation of each of the one or more second power control commands, wherein the one or more first power control commands for the primary component carrier are different from the one or more second power control commands for the secondary component carrier based on the primary component carrier and the secondary component carrier being in different frequency bands.

2. The method of claim 1, wherein the power control information includes:

a first power control configuration for the primary component carrier and a second power control configuration for the secondary component carrier.

3. The method of claim 2, wherein the first power control configuration and the second power control configuration include parameters for p0-nominal, p0-Set, pathlossReferenceRSs, and PUCCH-SpatialRelationInfo.

4. The method of claim 2, wherein the first power control configuration and the second power control configuration are received in radio resource control (RRC) signaling that provides uplink control channel power configuration parameters for configured component carriers.

5. The method of claim 2, wherein the first power control configuration includes a first indication of one or more component carriers in a first frequency band that are to use the first power control configuration, and the second power control configuration includes a second indication of one or more component carriers in a second frequency band that are to use the second power control configuration.

6. The method of claim 1, wherein the primary component carrier corresponds to a primary cell (PCell) and the secondary component carrier corresponds to a secondary cell (SCell) in the uplink carrier aggregation configuration.

7. The method of claim 1, further comprising:

applying the one or more first power control commands or the one or more second power control commands to one or more of the primary component carrier or the secondary component carrier.

8. The method of claim 7, wherein applying the one or more first power control commands or the one or more second power control commands further comprises:

applying the one or more first power control commands and the one or more second power control commands to each of the primary component carrier and the secondary component carrier.

9. The method of claim 7, wherein applying the one or more first power control commands or the one or more second power control commands further comprises:

applying the one or more first power control commands to the primary component carrier and the one or more second power control commands to the secondary component carrier.

10. The method of claim 7, further comprising:

receiving an indication that indicates whether to apply power control commands on a per component carrier basis or across multiple component carriers.

11. A method for wireless communication at a network entity, comprising:

transmitting, to a user equipment (UE), an uplink carrier aggregation configuration for a primary component carrier and a secondary component carrier, wherein the primary component carrier and the secondary component carrier are in a first physical uplink control channel group, and wherein the uplink carrier aggregation configuration enables uplink control channel communications on the primary component carrier and the secondary component carrier, and provides power control information for uplink control channel communications on the primary component carrier and the secondary component carrier;

transmitting, to the UE from the network entity, one or more first power control commands that each indicate an incremental stepwise decrease in uplink transmit power for the primary component carrier;

transmitting, to the UE from the network entity, one or more second power control commands that each indicate an incremental stepwise decrease in uplink transmit power for the secondary component carrier;

receiving a first uplink control channel communication from the UE via the primary component carrier, wherein a first uplink transmit power of the first uplink control channel communication is based at least in part on the power control information and accumulation of each of the one or more first power control commands; and receiving a second uplink control channel communication from the UE via the secondary component carrier, wherein a second uplink transmit power of the second uplink control channel communication is based at least in part on the power control information and accumulation of each of the one or more second power control commands, wherein the one or more first power control commands for the primary component carrier are different from the one or more second power control commands for the secondary component carrier based on the primary component carrier and the secondary component carrier being in different frequency bands.

12. The method of claim 11, wherein the power control information includes:

a first power control configuration for the primary component carrier and a second power control configuration for the secondary component carrier.

13. The method of claim 12, wherein the first power control configuration and the second power control configuration are provided in radio resource control (RRC) signaling that provides uplink control channel power configuration parameters for configured component carriers.

14. The method of claim 12, wherein the first power control configuration includes a first indication of one or more component carriers in a first frequency band that are to use the first power control configuration, and the second power control configuration includes a second indication of one or more component carriers in a second frequency band that are to use the second power control configuration.

15. The method of claim 11, wherein the primary component carrier corresponds to a primary cell (PCell) and the secondary component carrier corresponds to a secondary cell (SCell) in the uplink carrier aggregation configuration.

16. The method of claim 11, wherein the UE is configured to apply the one or more first power control commands or the one or more second power control commands to one or more of the primary component carrier or the secondary component carrier.

17. The method of claim 16, further comprising:

configuring the UE to apply both the one or more first power control commands and the one or more second power control commands to each of the primary component carrier and the secondary component carrier.

18. The method of claim 16, further comprising:

configuring the UE to apply the one or more first power control commands to the primary component carrier and the one or more second power control commands to the secondary component carrier.

19. The method of claim 16, further comprising:

transmitting an indication to the UE that indicates whether to apply power control commands on a per component carrier basis or across multiple component carriers.

20. A user equipment (UE), comprising:

one or more memories storing processor-executable code; and one or more processors coupled with the one or more memories and individually or collectively operable to execute the code to cause the UE to:

receive an uplink carrier aggregation configuration for a primary component carrier and a secondary component carrier, wherein the primary component carrier and the secondary component carrier are in a first physical unlink control channel group, and wherein the uplink carrier aggregation configuration enables uplink control channel communications on the primary component carrier and the secondary component carrier, and provides power control information for uplink control channel communications on the primary component carrier and the secondary component carrier;

receive, from a network entity, one or more first power control commands that each indicate an incremental stepwise decrease in uplink transmit power for the primary component carrier;

receive, from the network entity, one or more second power control commands that each indicate an incremental stepwise decrease in uplink transmit power for the secondary component carrier;

transmit a first uplink control channel communication via the primary component carrier using a first uplink transmit power, wherein the first uplink transmit power is based at least in part on the power control information and accumulation of each of the one or more first power control commands; and transmit a second uplink control channel communication via the secondary component carrier using a second uplink transmit power, wherein the second uplink transmit power is based at least in part on the power control information and accumulation of each of the one or more second power control commands, wherein the one or more first power control commands for the primary component carrier are different from the one or more second power control commands for the secondary component carrier based on the primary component carrier and the secondary component carrier being in different frequency bands.

21. The UE of claim 20, wherein the power control information includes:

a first power control configuration for the primary component carrier and a second power control configuration for the secondary component carrier.

22. The UE of claim 20, wherein the one or more processors are individually or collectively further operable to execute the code to cause the UE to:

apply the one or more first power control commands or the one or more second power control commands to one or more of the primary component carrier or the secondary component carrier.

23. A network entity, comprising:

one or more memories storing processor-executable code; and one or more processors coupled with the one or more memories and individually or collectively operable to execute the code to cause the network entity to:

transmit, to a user equipment (UE), an uplink carrier aggregation configuration for a primary component carrier and a secondary component carrier, wherein the primary component carrier and the secondary component carrier are in a first physical uplink control channel group, and wherein the uplink carrier aggregation configuration enables uplink control channel communications on the primary component carrier and the secondary component carrier, and provides power control information for uplink control channel communications on the primary component carrier and the secondary component carrier;

transmit, to the UE from the network entity, one or more first power control commands that each indicate an incremental stepwise decrease in uplink transmit power for the primary component carrier;

transmit, to the UE from the network entity, one or more second power control commands that each indicate an incremental stepwise decrease in uplink transmit power for the secondary component carrier;

receive a first uplink control channel communication from the UE via the primary component carrier, wherein a first uplink transmit power of the first uplink control channel communication is based at least in part on the power control information and accumulation of each of the one or more first power control commands; and receive a second uplink control channel communication from the UE via the secondary component carrier, wherein a second uplink transmit power of the second uplink control channel communication is based at least in part on the power control information and accumulation of each of the one or more second power control commands, wherein the one or more first power control commands for the primary component carrier are different from the one or more second power control commands for the secondary component carrier based on the primary component carrier and the secondary component carrier being in different frequency bands.

24. The network entity of claim 23, wherein the power control information includes a first power control configuration for the primary component carrier and a second power control configuration for the secondary component carrier.

25. The network entity of claim 23, wherein the UE is configured to apply the one or more first power control commands or the one or more second power control commands to one or more of the primary component carrier or the secondary component carrier.

26. The UE of claim 20, wherein the primary component carrier corresponds to a primary cell (PCell) and the secondary component carrier corresponds to a secondary cell (SCell) in the uplink carrier aggregation configuration.

27. The network entity of claim 23, wherein the primary component carrier corresponds to a primary cell (PCell) and the secondary component carrier corresponds to a secondary cell (SCell) in the uplink carrier aggregation configuration.

* * * * *